(12) United States Patent
Abadi et al.

(10) Patent No.: US 9,336,263 B2
(45) Date of Patent: May 10, 2016

(54) DATA LOADING SYSTEMS AND METHODS

(75) Inventors: Daniel Abadi, Sudbury, MA (US); Azza Abouzied, Halifax (CA)

(73) Assignee: Yale University, New Haven, CT (US)

( * ) Notice: Subject to any disclaimer, the term of this patent is extended or adjusted under 35 U.S.C. 154(b) by 21 days.

(21) Appl. No.: 13/032,538

(22) Filed: Feb. 22, 2011

(65) Prior Publication Data

US 2011/0302226 A1 Dec. 8, 2011

Related U.S. Application Data

(60) Provisional application No. 61/396,928, filed on Jun. 4, 2010.

(51) Int. Cl.
*G06F 17/00* (2006.01)
*G06F 17/30* (2006.01)

(52) U.S. Cl.
CPC ...... *G06F 17/3038* (2013.01); *G06F 17/30569* (2013.01)

(58) Field of Classification Search
CPC ................. G06F 17/3038; G06F 17/30569
USPC ....................................................... 707/825
See application file for complete search history.

(56) References Cited

U.S. PATENT DOCUMENTS

| | | | |
|---|---|---|---|
| 4,412,130 A | | 10/1983 | Winters |
| 4,615,870 A | | 10/1986 | Armstrong et al. |
| 5,179,699 A | * | 1/1993 | Iyer et al. |
| 5,413,154 A | | 5/1995 | Hurst, Jr. et al. |
| 6,357,536 B1 | | 3/2002 | Schrader et al. |
| 7,085,769 B1 | | 8/2006 | Luo et al. |
| 7,957,365 B2 | | 6/2011 | Hsu et al. |
| 8,069,210 B2 | | 11/2011 | Gillum et al. |
| 8,555,265 B2 | | 10/2013 | Chambers et al. |
| 2004/0007142 A1 | | 1/2004 | Jollez et al. |
| 2005/0092523 A1 | | 5/2005 | McCaskill et al. |
| 2005/0183574 A1 | | 8/2005 | Burnett et al. |
| 2005/0263541 A1 | | 12/2005 | Hoff et al. |
| 2006/0117036 A1 | | 6/2006 | Cruanes et al. |
| 2007/0038659 A1 | | 2/2007 | Datar et al. |

(Continued)

FOREIGN PATENT DOCUMENTS

| | | |
|---|---|---|
| WO | WO-2011/153239 A2 | 12/2011 |
| WO | WO-2011/153242 A1 | 12/2011 |
| WO | WO-2013/009503 A2 | 1/2013 |

OTHER PUBLICATIONS

Dean et al., "MapReduce: Simplified Data Processing on Large Clusters", Communications of the ACM Jan. 2008/vol. 51, No. 1.*

(Continued)

*Primary Examiner* — Mariela Reyes
*Assistant Examiner* — Mohsen Almani
(74) *Attorney, Agent, or Firm* — Mintz Levin Cohn Ferris Glovsky and Popeo, P.C.

(57) ABSTRACT

System, method, and computer program product for processing data are disclosed. The system is configured to perform transfer of data from a file system to a database system. Such transfer is accomplished through receiving a request for loading data into a database system, wherein the data includes a plurality of attributes, determining at least one attribute of the data for loading into the database system, and loading the at least one attribute of the data into the database system while continuing to process remaining attributes of the data.

58 Claims, 13 Drawing Sheets

(56) References Cited

U.S. PATENT DOCUMENTS

| | | | |
|---|---|---|---|
| 2008/0086442 | A1 | 4/2008 | Dasdan et al. |
| 2008/0098370 | A1 | 4/2008 | Fontoura et al. |
| 2008/0120314 | A1 | 5/2008 | Yang et al. |
| 2008/0126397 | A1 | 5/2008 | Alexander et al. |
| 2008/0243908 | A1 | 10/2008 | Aasman et al. |
| 2009/0055370 | A1 | 2/2009 | Dagum et al. |
| 2009/0271412 | A1 | 10/2009 | Lacapra et al. |
| 2009/0319550 | A1* | 12/2009 | Shau et al. .................. 707/101 |
| 2010/0083194 | A1 | 4/2010 | Bagherjeiran et al. |
| 2010/0114628 | A1 | 5/2010 | Adler et al. |
| 2010/0241644 | A1 | 9/2010 | Jackson et al. |
| 2010/0241828 | A1 | 9/2010 | Yu et al. |
| 2010/0281166 | A1 | 11/2010 | Buyya et al. |
| 2011/0191361 | A1 | 8/2011 | Gupta et al. |
| 2011/0202534 | A1 | 8/2011 | Allerton |
| 2011/0302151 | A1 | 12/2011 | Abadi et al. |
| 2011/0302583 | A1 | 12/2011 | Abadi et al. |
| 2011/0314019 | A1 | 12/2011 | Jimenez Peris et al. |
| 2011/0320431 | A1 | 12/2011 | Jackson et al. |
| 2012/0310916 | A1 | 12/2012 | Abadi et al. |

OTHER PUBLICATIONS

Abouzeid, Azza et al., "HadoopDB: An Architectural Hybrid of MapReduce and DBMS Technologies for Analytical Workloads", Proceedings of VLDB, (2009).

Chen, Qiming et al., "Efficiently Support MapReduce-Like Computation Models Inside Parallel DBMS", Proceedings of the 2009 International Database engineering & Applications Symposium, Series—Ideas, pp. 43-53, (2009).

Choi, Hyunsik, et al., "Spider", Proceedings of the 18th ACM Conference on Information and Knowledge Management, CIKM, pp. 2087-2088, (2009).

Elmasri et al., "Fundamentals of Database Systems", Fourth Edition, (2004).

Gennick, Jonathan, et al., "Oracle SQL*Loader: The Definitive Guide", pp. 1-242 (2001).

Graefe, G., "Query Evaluation Techniques for Large Databases", ACM Computing Surveys, ACM, 25:2, pp. 73-170, (1993).

Guo, Y., et al., "Lubm: A benchmark for owl knowledge base systems," J. Web Sem., 3(23):158-182, (2005).

Ideros, S., et al., "Database cracking", CIDR '07, pp. 68-78, (2007).

Ideros, S., et al., "Self-organizing tuple reconstruction in column-stores", SIGMOD '09, pp. 297-30, (2009).

Kossman, D., "The State of the Art in Distributed Query Processing", ACM Computing Surveys, 32:4, pp. 422-469 (2000).

Neumann, T., et al., "The rdf-3x engine for scalable management of rdf data," The VLDB Journal, 19:91-113, (2010).

PeterSaAWS, "Processing and Loading Data from Amazon S3 to the Vertica Analytic Database", http://aws.amazon.com/articles/2571 (2009).

Rohloff, K., et al., "High-performance, massively scalable distributed systems using the mapreduce software framework: The shard triple-store. International Workshop on Programming Support Innovations for Emerging Distributed Applications," (2010).

SPARQL Query Language for RDF, W3C Working Draft 4, (2006).

Stonebraker, Michael et al., "MapReduce and Parallel DBMSs: Friends or Foes?", Communications of the ACM, 53:1, p. 64, (2010).

Yang, Christopher et al., "Osprey: Implementing MapReduce-Style Fault Tolerance in a Shared-Nothing Distributed Database", Data Engineering (ICDE), IEEE 26th International Conference pp. 657-668, (2010).

Ying Yan, et al., "Efficient Indices Using Graph Partitioning in RDF Triple Stores", Data Engineering, 2009, ICDE, IEEE 25th International Conference on Engineering, pp. 1263-1266, (2009).

Zukowski, M., "Balancing Vectorized Query Execution with Bandwidth-Optimized Storage", Ph.D. Thesis, Universiteit van Amsterdam, Amsterdam, The Netherlands, (2009).

International Search Report for PCT/US2011/038763 mailed Aug. 26, 2011.

International Search Report for PCT/US2012/044981 mailed Apr. 11, 2014.

International Search Report for PCT/US2011/038758 mailed Mar. 14, 2013.

* cited by examiner

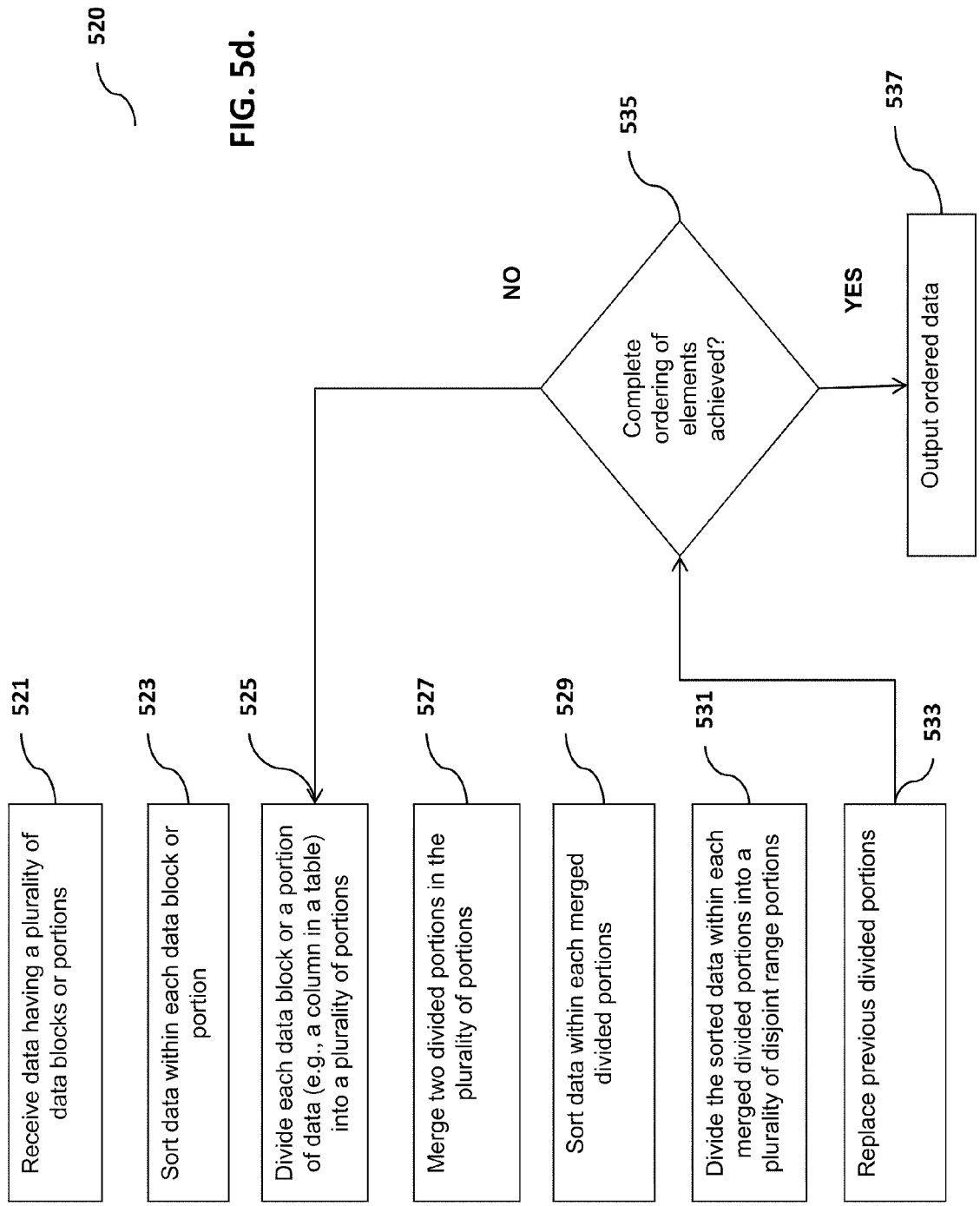

| | Strategy | Description |
|---|---|---|
| 1 | SQL Pre-load | Pre-load the entire dataset into the database using SQL's 'COPY INTO' command. Data is sorted after loading using 'ORDER BY'. |
| 2 | Incremental Re-organize (all) | Load the entire dataset into the database upon its first access, but unlike Pre-load above, do not immediately sort the data. Instead, data within the database is incrementally reorganized as more queries access the data. |
| 3 | Incremental Reorganize (subset) | Same as Incremental Reorganize (all), except that only those attributes that are accessed by the current MapReduce job are loaded. Attributes that are accessed at a later time are loaded at this later time and caught up to the reorganization work that the earlier loaded attributes have made. |
| 4 | Invisible Loading (all) | The invisible loading algorithm described in Section 2, except that all attributes are loaded into the database (instead of the subset accessed by a particular MapReduce job). |
| 5 | Invisible Loading (subset) | The complete invisible loading algorithm described in Section 2. |
| 6 | MapReduce | Process the data entirely in Hadoop without database loading or reorganization. This is the performance the user can expect to achieve if it is never loaded into a database system. |

Table 1: Loading Strategies

FIG. 6.

DATA LOADING SYSTEMS AND METHODS

CROSS-REFERENCE TO RELATED APPLICATIONS

The present application claims priority to U.S. Provisional Patent Application No. 61/396,928 to Abadi, filed on Jun. 4, 2010, and entitled "Invisible Loading From File Systems To Database Systems" and incorporates its disclosure herein by reference in its entirety.

TECHNICAL FIELD

The current subject matter generally relates to data processing and analysis and in particular, to systems and methods for processing large-scale data. Even more particularly, the current subject matter relates to systems and methods for efficiently loading data for processing in a large-scale database systems.

BACKGROUND

A large amount of structured data resides on a traditional file system. Examples include logs (especially network event logs), machine output from scientific experiments, simulation data, sensor data, and online clickstreams. Much of this data is write-once (typically append-only) and is usually analyzed many times over the course of its lifetime. This type of data is structured and can be easily fit into a relational model. However, the ACID (atomicity, consistency, isolation, durability) guarantees and careful data organization of traditional database systems are often not needed. Moreover, database systems require that a schema be clearly defined, and data loaded into the system before it can be used, a time and effort overhead often deemed unnecessary for this type of data.

Since much of this data is machine generated, the rate of production of this data is increasing, to a first order of approximation, at the rate of Moore's law. It is no longer uncommon to hear of logs or scientific experiment output of hundreds of terabytes to petabytes in size. Hence, traditional file systems are no longer able to handle data at this scale, and distributed file systems and so-called "No-SQL" systems are becoming a popular solution for storing and serving as the analytical platform for this data. Perhaps the most well-known of these new systems is Hadoop, which bundles an open source version of Google's distributed file system called Hadoop Distributed File System ("HDFS") with an implementation of a MapReduce framework on top of it, which can be used to analyze the data stored in HDFS (or various other input sources). For example, Facebook has 2.5 petabytes of clickstream data stored and managed entirely in HDFS/Hadoop and are adding 15 terabytes per day to this dataset.

These new No-SQL systems are extremely scalable and have the ease of use that one can expect to get from a file system. Moreover, the data stored in these systems have a very low "time-to-first analysis" in the sense that as soon as the data is produced, it is available for analysis via simple scripts or MapReduce jobs. This is in stark contrast with database systems that, as mentioned above, require data to be loaded before SQL queries can be run. Recent work that compared the performance of Hadoop with database systems demonstrated that once data has been loaded, database systems are able to take advantage of their optimized data layout (performed during load) to significantly outperform Hadoop on most queries. Thus, the cumulative performance of the database system was found to be significantly better than Hadoop over the course of many queries during the lifetime of the data. However, the time to obtain the first query result was much worse (due to the fact that load time needs to be counted) and this initial overhead is, in some cases, unacceptable to impatient developers who desire immediate gratification.

Although the load time in database systems is adjustable (depending on the amount of indexing, sorting, cleaning, etc. that needs to be done), the requirement to define a schema for the data is generally not. It is sometimes the case that the person who wants to analyze the data is not intimately familiar with how the data is created, and only understands a subset of the meaning of each event or reading that is produced. Take, for example, a new member of a research group that inherits a simulation program written by a Ph.D. student who has since graduated, or a scientist that wants to analyze the output of experimental data produced by a machine whose manufacturer's documentation is unavailable (or the scientist simply can't be bothered to find it), or a systems administrator who understands the meaning of only the first few fields in each event that has been logged. In these situations, people who want to analyze the data typically understand which fields are the ones that are relevant to their analysis, but they don't have a detailed enough knowledge of the less important fields, and don't want to be responsible for generating a schema for this data for use in a database system.

For these people, the schema-free nature of Hadoop-like systems is a huge advantage. They can keep their data stored in the file system (or in simple key-value data structures) and run scripts against this data, parsing the relevant (and understood) attributes for their analysis from each event at runtime. It is thus possible for a group of people to analyze the parts of the data that they understand, even though none of them understand it well enough to take responsibility for loading it into a database system.

There are thus two dominant options for storing and managing structured data that originates in file systems. One can either keep it there, often using No-SQL options such as Hadoop for data management, or one can load it into a database system. The former option has a lower time-to-first analysis overhead, while the latter option has much better longer term performance.

Thus, there is a need for a data management platform that has a low time-to first-analysis parameter and yields long-term performance benefits that come with loading data into a database system for analysis. In some embodiments, parsing and tuple extraction operations of data processing tasks (e.g., if MapReduce framework is used, then it is the MapReduce parsing and tuple extractions that can be piggybacked on) to transparently load tuples into databases, while simultaneously analyzing the data. In some embodiments, for loading purposes, a column-store technique for the database system can be used so that different columns can be loaded independently. Further, as soon as data is loaded in databases, each query accessing the data performs some incremental effort towards further clustering and indexing the data.

SUMMARY

In some embodiments, the current subject matter relates to a method for processing and transferring data from a file system to a database system. The method includes receiving a request for loading into a database system, wherein the data includes a plurality of attributes, determining, based on the request, at least one attribute of the data for loading into the database system, and loading the at least one attribute of the data into the database system while continuing to process remaining attributes of the data.

In some embodiments, the receiving operation can also include parsing the attributes of the data as a result of the received request. In some embodiments, the method also includes incrementally loading each parsed attribute of the received data into the database system as soon as each parsed attributed is processed. Further, each processed parsed attribute is can be indexed in the database system. Indexing of the attributes is configured to be performed incrementally as soon as each processed parsed attributed is loaded into the database system.

In some embodiments, any processing operations (e.g., file requests) access the received data loaded into the database system, determine attributes of the data that have not been loaded into the database system, parse the attributes that have not been loaded into the database system, process the parsed unloaded attributes to determine at least one unloaded attribute for loading into the database system, and loading at least one processed parsed unloaded attribute of the data into the database system while continuing to process the remaining unloaded attributes of the data. Each loaded processed parsed unloaded attribute is indexed in the database system.

In some embodiments, loading includes loading the attributes into a column-store, whereby each different column of the received data is loaded independently into the database system. Loading can be a direct loading, wherein parsed attributes of the received data are loaded into the database system as soon as the attributes are processed, or a delayed loading, wherein parsed attributes of the received data are initially temporarily stored in a temporary storage and then loaded into the database system.

In some embodiments, loading further includes (a) dividing a column of loaded attributes into a plurality of portions; (b) sorting the plurality of portions to obtain a first order of attributes within the column of loaded attributes; (c) dividing the plurality of sorted portions of attributes into further plurality of portions; (d) sorting the further plurality of portions to obtain a second order of attributes within the column of loaded attributes; (e) repeating steps (c)-(d) to obtain a final order of attributes of the data.

In some embodiments, the current subject matter relates to a data processing system for transferring data having a plurality of attributes from a file system to a database system. The system includes a processor configured to receive a request for loading data into a database system, wherein the data includes a plurality of attributes and to determine at least one attribute of the data for loading into the database system, and a data loader module configured to load the at least one attribute of the data into the database system while the processor continues to process remaining attributes of the data.

In some embodiments, the current subject matter relates to a computer program product, tangibly embodied in a computer-readable medium, the computer program product being operable to cause a data processing system for transferring data from a file system to a database system, to perform the following operations: receiving a request for loading data into a database system, wherein the data includes a plurality of attributes; determining, based on the request, at least one attribute of the data for loading into the database system; and loading the at least one attribute of the data into the database system while continuing to process remaining attributes of the data.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

Articles are also described that comprise a tangibly embodied machine-readable medium embodying instructions that, when performed, cause one or more machines (e.g., computers, etc.) to result in operations described herein. Similarly, computer systems are also described that can include a processor and a memory coupled to the processor. The memory can include one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The current subject matter is described with reference to the accompanying drawings. In the drawings, like reference numbers indicate identical or functionally similar elements.

FIG. 5d is a flow chart illustrating an exemplary incremental merge sort method performed by the data processing system shown in FIGS. 5b-c, according to some embodiments of the current subject matter.

FIG. 6 is a table illustrating exemplary data loading techniques, according to some embodiments of the current subject matter.

DETAILED DESCRIPTION

Figure 1:
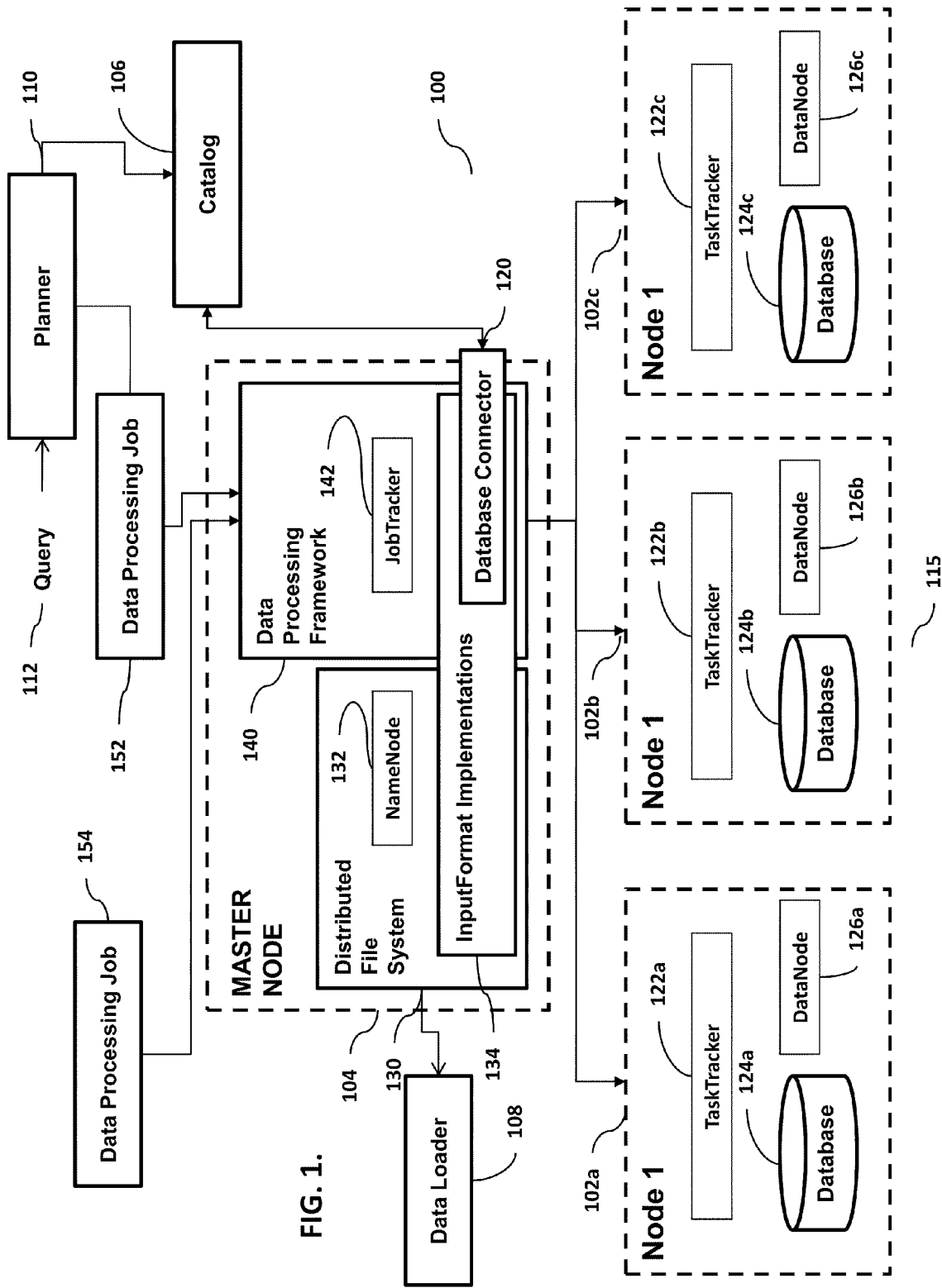
FIG. 1 illustrates an exemplary embodiment of a system for data processing, according to some embodiments of the current subject matter.

FIG. 1 illustrates an exemplary data processing system 100, according to some embodiments of the current subject matter. The system 100 can be configured to connect a plurality of nodes 102 (a, b, c) with a master node 104. A master node 104 may be configured to receive a processing task (e.g., a query) and distribute various processing tasks involved in the query to nodes 102. In some embodiments, the nodes can be configured to be connected using a communication layer (not shown in FIG. 1). In some embodiments, a MapReduce ("MR") framework can be used as such communication layer. As can be understood by one having ordinary skill in the art, other types of frameworks can be used and the current subject matter is not limited to the MR framework. Each node 102 is configured to include a task tracker component 122, a database 124, and a data node 126. As shown in FIG. 1, the system 100 further includes the following components/processing components: a database connector component 120, a catalog component 106, a data loader component 108, and a query execution planning component or planner 110. A query (e.g., an SQL query) for processing on nodes 102 can be received by the planner 110. The planner 112 can be configured to communicate with the master node 104's database processing framework 140 that can be further configured to generate various tasks and pass them onto the nodes 102 for processing, as discussed below. By way of an example. the database processing framework 140 can include a MapReduce framework or any type of framework. As can be understood by one skilled in the art, the current subject matter is not limited to the any particular database processing framework. In some embodiments, a partition of a data processing task can refer to an execution of a series of processing tasks (such as relational operators) on a partition of data (as may be the case for tasks assigned to database systems) or an execution of a series of processing tasks on an entire dataset (as may be the case for a partition assigned to a data processing framework).

In some embodiments, the system 100 can be configured to implement a distributed file system ("DFS") that can be used for connecting multiple single-node database systems and can be configured as a task coordinator and a network communication layer. In some embodiments, received queries can be parallelized across nodes using the framework 140 and the system 100 can be further configured to distribute processing of a query to single-node's databases 124 (a, b, c). For example, upon receipt of a query 112 (or a data processing task), a query execution plan can be generated, whereby the query can be broken up into various partitions, parts and/or tasks, which can be further distributed across the nodes 102 (a, b, c) in a cluster for processing. In some embodiments, such processing can occur in parallel on all nodes 102 that receive a query task. Distribution of tasks can be done based on node availability and capacity. For example, a node cannot receive more data than it can optimally store and/or handle/manage. If data is to be loaded into the database nodes, the data can be broken up/partitioned into a plurality of portions and distributed across nodes based on various factors, including but not limited to, capacity, node's ability to process specific data, etc. Upon distribution of data and/or tasks to independent nodes, each node can be configured to process the tasks/data and the system 100 can be configured to coordinate such processing and node performance (e.g., a job tracker 142 can be configured to coordinate and monitor node-processing and performance). In some embodiments, portions (or partitions) of data/task can be independent of one another, while other portions can require inter-node communication and coordination to process a task. The independent portions might not require such coordination/communication. The catalog storage component 106 can be configured to maintain/track information about each data partition being sent to nodes 102. Through such distribution, use of various scheduling tools, and job tracking, the system 100 can be configured to achieve an excellent fault tolerance and ability to operate in heterogeneous environments. The system 100 can further achieve great performance of parallel databases by processing queries inside engines of databases 124.

Referring back to FIG. 1, system 100 further includes two layers: (i) a data storage layer or a distributed file system ("DFS") 130, and (ii) a data processing layer or framework 140. DFS 130 is shown as a block-structured file system that can be managed by a central name node 132 (shown as "NameNode"). In operation, individual files can be broken into blocks of a predetermined fixed size and distributed across multiple data nodes 102 (a, b, c) in the cluster 115, where the cluster 115 consists of multiple single nodes 102. The name node 132 can be configured to maintain metadata about size and location of blocks and their replicas. As stated above, the catalog component 106 can be further configured to keep track of how and where the data is distributed.

As shown in FIG. 1, the data processing layer 140 follows simple master-slave architecture. The master is the master node 104 that includes a single job tracker 142 contained and the slaves or worker nodes are nodes 102(a, b, c) that include task trackers 122 (a, b, c). The job tracker 142 can handle runtime scheduling of data processing jobs 152, 154 (e.g., MapReduce jobs) and maintain information on each task tracker 122's load and available resources. The task trackers 122 can handle processing of processing of part or all of the data processing jobs that are assigned to them by the job tracker 142. Each processing job can be broken down into various phases, each of which includes a plurality of sub-tasks or sub-phases that perform processing based on the number of data blocks that require such processing. The job tracker 142 assigns tasks/sub-phases to task trackers 122 based on locality and load balancing. Locality can be determined by matching task trackers 122 to appropriate tasks that process data, which is local to them. The job tracker 142 can perform load-balancing by ensuring all available task trackers are assigned tasks. Task trackers 122 regularly update the job tracker 142 with their status through "heartbeat messages." A heartbeat message is a message sent from an origin (i.e., a task tracker) to a destination (i.e., a job tracker) that enables the destination to identify if and when the origin fails or is no longer available.

As shown in FIG. 1, the system 100 further includes an input format implementations library 134 which can be configured to be an interface between the storage layer 130 and the processing layer 140. The input format implementations library 134 can be configured to parse text/binary or other types of files (or connect to arbitrary data sources) and to transform the data into key-value pairs that can be processed during one of the above phases. By way of an example, conventional Hadoop system can be configured to provide several input format implementations including one that allows single JAVA® database connectivity ("JDBC")-compliant database to be accessed by all tasks in one job in a given cluster.

Figure 2:
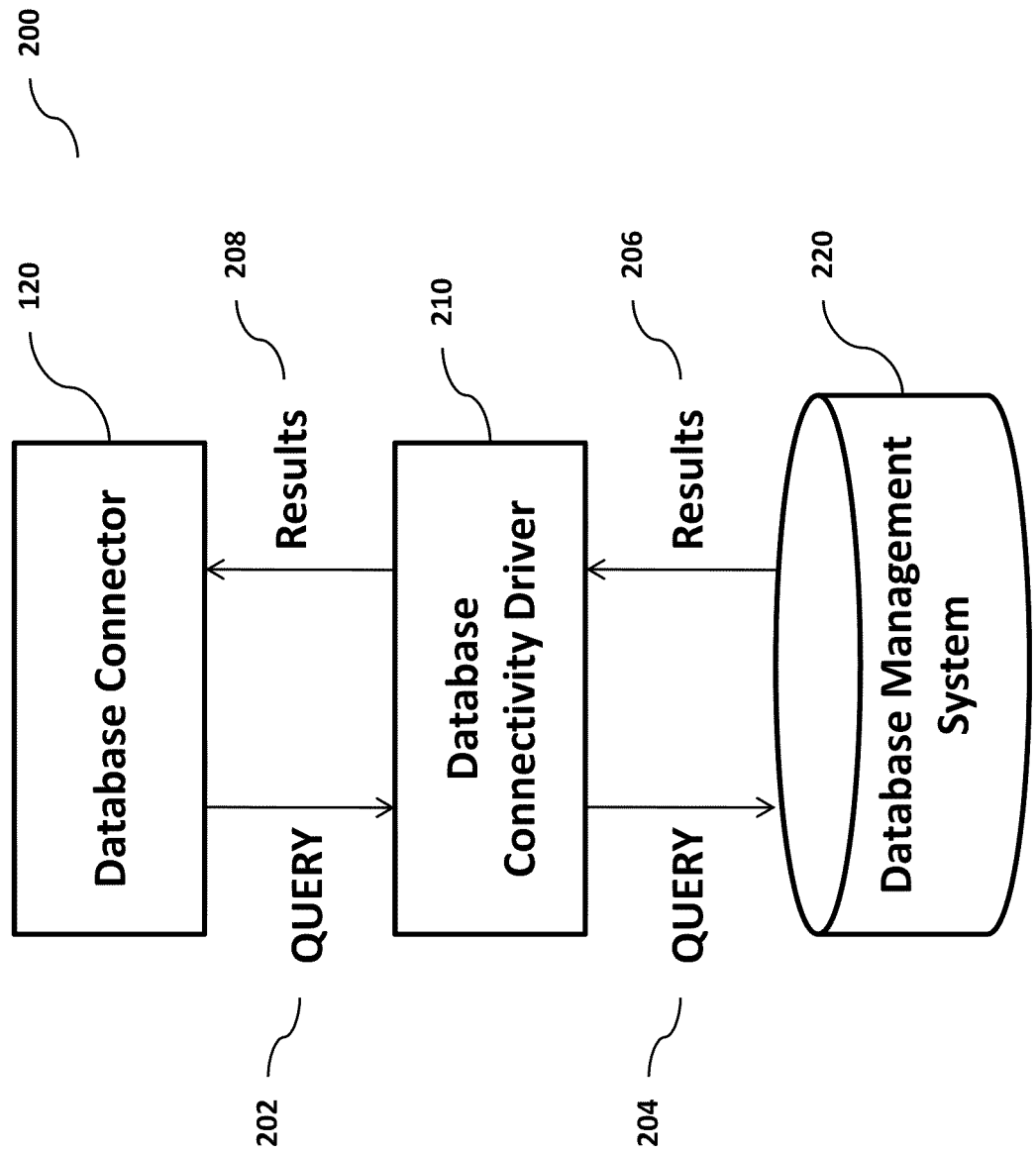
FIG. 2 illustrates an exemplary database connector component of the system shown in FIG. 1, according to some embodiments of the current subject matter.

In some embodiments, the database connector 120 can be configured to provide an interface between database systems 124 residing on nodes 102 in the cluster 115 and task trackers 122. The database connector 120 can be configured to be a part of the input format implementations library 134. In some embodiments, during query (phase, sub-phase, or task) processing/execution the connector 120 receives a data processing query (e.g., an SQL or any other type of programming language query) and appropriate connection parameters, which include, but are not limited to, which drivers to use, query fetch size and other query tuning parameters. The connector 120 is configured to connect to the database 124, execute the query and return results as key-value pairs. In some embodiments, the connector 120 can be configured to connect to any database that resides in the cluster 115. Prior to processing, queries can be configured to be optimized in accordance with requirements of a specific database. In some embodiments, examples of such databases include, but are not limited to, MySQL, PostgreSQL, column-store (i.e., storing content by columns rather than by rows) databases (e.g., open-source, MonetDB, InfoBright, etc.), and other database systems. Other types of database systems can be used with the system 100 and the current subject matter is not limited to the above-referenced database systems. FIG. 2 illustrates an exemplary operation 200 of the database connector 120, according to some embodiments of the current subject matter. As stated above, the database connector can receive a query for processing (e.g., obtaining specific data from a database management system 220, which can include databases 124). The query is initially processed by the database connector 120 and passed on (at 202) to a database connectivity driver 210 (e.g., JAVA® Database Connectivity Driver). The driver 210 then passes (at 204) the query to the database management system 220 for obtaining data requested in the query received by the database connector 120. The database management system 220 returns requested data (at 206) via the database connectivity driver 210 to the database connector 120 (at 208).

In some embodiments, the catalog component 106 can be configured to communicate with the planner 110 and database connector 120. The catalog 106 can be further configured to store meta-information about the databases 124. The information includes, but is not limited to, the following information: (i) connection parameters such as database location, driver class and credentials, (ii) metadata such as data sets contained in the cluster, replica locations, and data partitioning properties. The catalog 106 can be configured to store such meta-information in various formats, such as an XML file, in the DFS 130. This file can be accessed by job tracker 142 and task trackers 122 to retrieve information necessary to schedule tasks and process data needed by a query.

Figure 3:
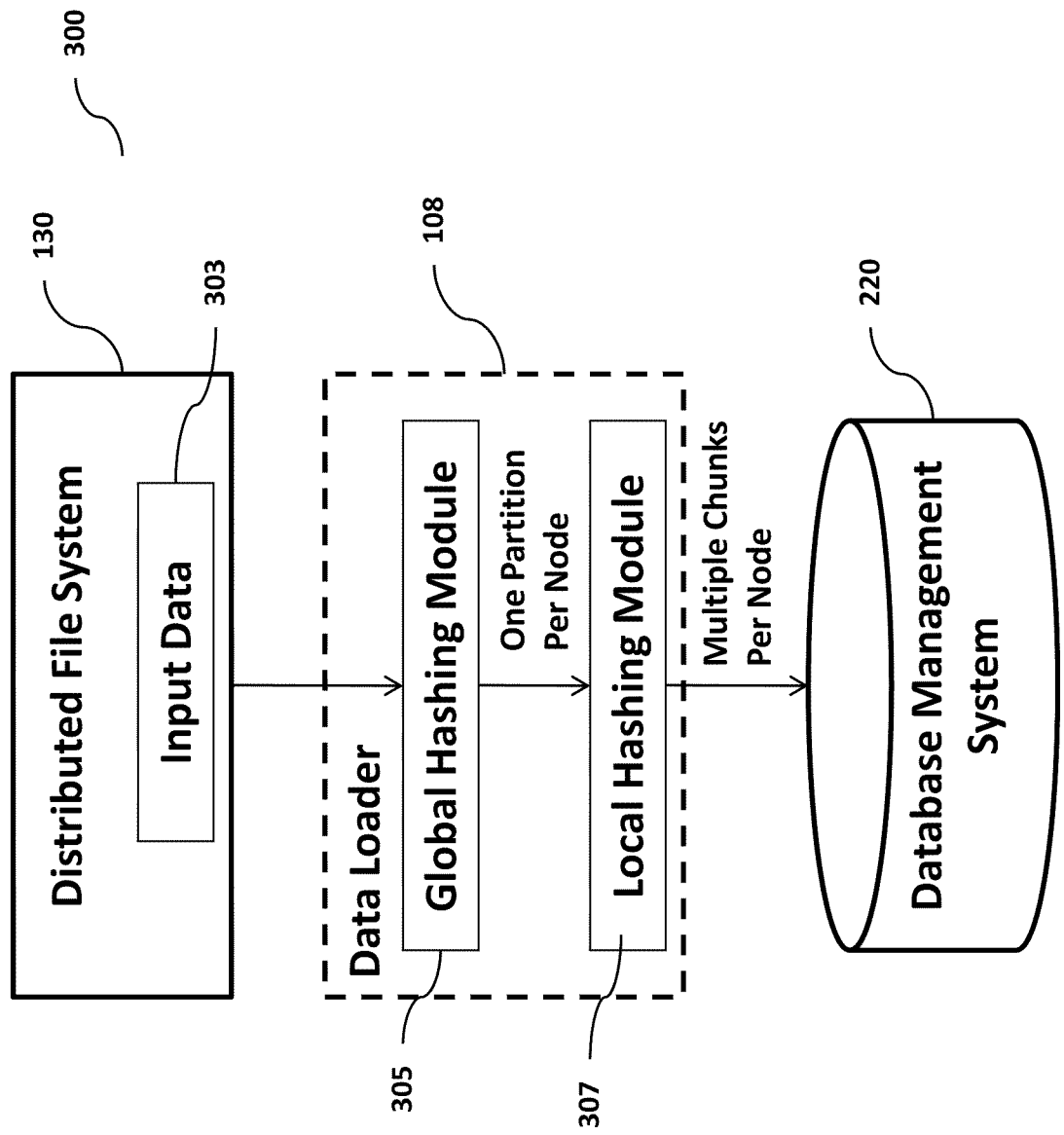
FIG. 3 illustrates an exemplary data loader component of the system shown in FIG. 1, according to some embodiments of the current subject matter.

In some embodiments, the data loader component 108 can be configured to (i) globally repartition data on a given partition key upon loading, (ii) break apart single node data into multiple smaller partitions or chunks and (iii) bulk-load the single-node databases with the chunks. FIG. 3 illustrates an exemplary operation 300 of the data loader component 108 in connection with system 100 shown in FIG. 1. The data loader 108 can include a global hashing component 305 and a local hashing component 307. The global hashing component 305 can be configured to read raw data files or input data 303 stored in the DFS 130 and repartition them into as many portions as there are nodes 102 in the cluster 115. The local hashing component 307 then copies a partition from the DFS 130 into a local file system of each node 102 and secondarily partitions the file into smaller sized chunks based on a predetermined maximum chunk size setting. In some embodiments, the maximum chunk setting can be predetermined by the system 100 or any other factors.

The hashing functions can be used by both the global hashing component 305 and the local hashing component 307 can be configured to be different in order to ensure that the resulting partitioned chunks have a uniform size. Additionally, the hashing functions can be further configured to ensure better load-balancing when executing processing phases/tasks over the stored data. Any hashing functions can be used for the global and/or local hashing components 305, 307.

Figure 4:
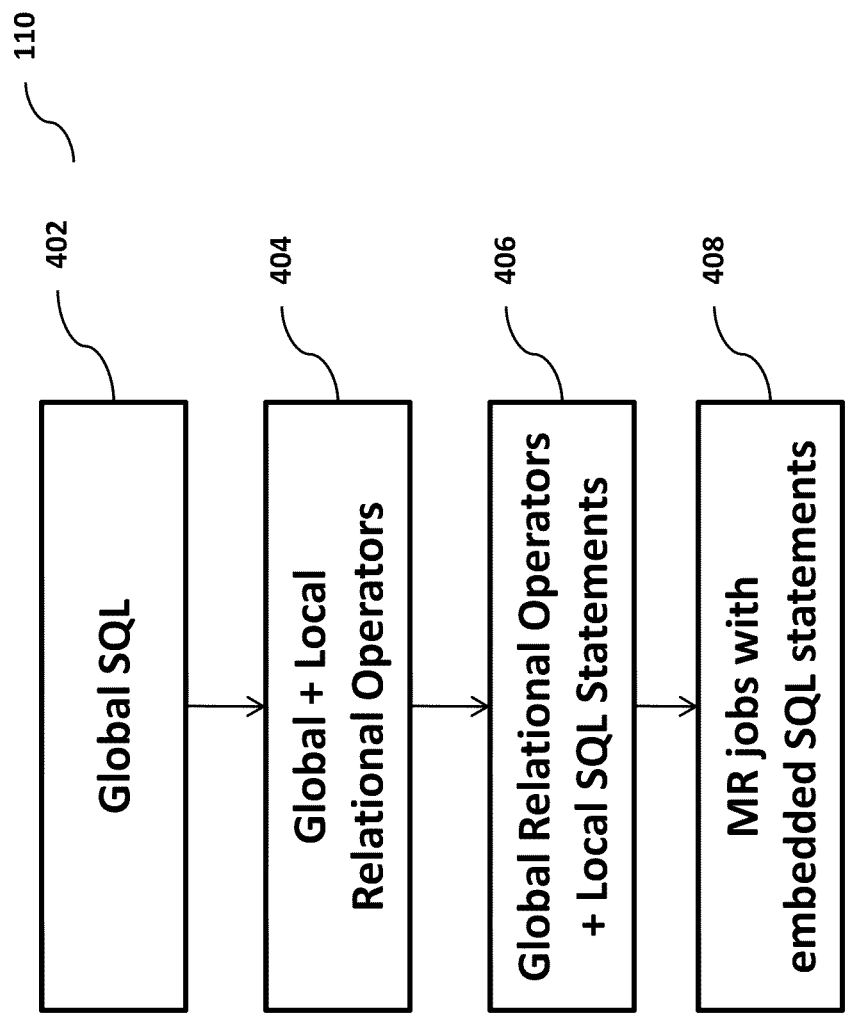
FIG. 4 illustrates an exemplary planner component of the system shown in FIG. 1, according to some embodiments of the current subject matter.

Thus, in some embodiments, the system 100 can be configured to provide a parallel database front-end for query processing purposes via the planner component 110. The planner 110 can be configured to provide an interface for the system 100 and can be further configured to receive a query 112 for further processing by the system 100. The planner 110 can be further configured to perform translation of the query into appropriate format in accordance with requirements of a particular database where data is stored. In some exemplary embodiments, as shown in FIG. 4, the planner 110 can transform SQL quer(ies) (at 402) into global and local relational operators (at 404), which are then transformed into global relational operators and local SQL statements, respectively (at 406), and finally transformed into MapReduce job(s) (at 408). The MapReduce job(s) are then further transformed into SQL language for processing by the nodes in the system 100. In order to process data from the DFS 130, the planner 110 can be configured to implement various relational operators, such as, filter, select (project), join, and aggregation, which operate as iterators: each operator forwards a data tuple to the next operator after processing it (a data tuple is an ordered list of elements). In some embodiments, the DFS 130 can be configured to store data in tables, which can be collocated on a node 102 (some tables can be not collocated). Each table can be stored as a separate file in the DFS 130. The current subject matter can be configured to process all types of tables (including collocated and not collocated tables) and if such tables are partitioned on the same attribute (a common identifier to some elements in the tables), a join operation (i.e., merging of data from tables based on a predetermined join attribute) can be accomplished at the database layer in its entirety.

As stated above, the current subject matter can be configured to push as much query processing as possible into the single-node databases 124 by issuing various processing directive(s) (e.g., SQL or any other programming language statements, commands, functions, etc.). Such processing directives can include selection, projection, and partial aggregation, which can be performed during various phases of a query. Since the current subject matter implements a parallel database processing system, it is capable of providing higher performance due to more efficient operator implementation, better I/O handling, and clustering/indexing provided by its database management system ("DBMS"). Parallel database processing allows for a more efficient processing of co-partitioned tables (e.g., tables that have been hash partitioned on a join attribute) by processing join operations inside the database system of each node. By processing join operations in the database system, joins become local operations (no need to send data over the network) and are performed inside the DBMS which typically implements these operations very efficiently.

In some embodiments, the current subject matter can be configured to transparently move data from a file system to a database system without any human intervention. In some embodiments, the code associated with data processing tasks (e.g., MapReduce tasks) can be leveraged for parsing and extracting tuples from data in the file system to "invisibly" load the parsed data tuples data into the database system. To be truly "invisible": (i) one is not forced to rewrite a data processing tasks to include loading operations or parsing functions for attributes that he/she does not analyze, and (ii) one does not notice the additional performance overhead of loading work that is piggybacked on top of the regular analysis.

In some embodiments, the current subject matter can be configured to initially store data in the DFS 130. This data is immediately available for analysis using standard processing tasks (e.g., if MapReduce framework is implemented, such tasks are MapReduce ("MR") jobs). Database loading can occur as a side-effect of executing such tasks over a data set. Scanning and parsing performed by the task can be leveraged in processing data for the purposes of simultaneously loading the parsed data into a database system. In some embodiments, each time a node accesses local DFS data, the node's local database system can be loaded with this data. Therefore, all loading can occur locally with no data transfer between nodes.

In some embodiments, in order to ensure invisibility of the data loading, only the vertical and horizontal partitions of the data can be loaded during execution of the data processing task. A vertical partition can imply that not all attributes of a data set are loaded: only the attributes that are processed by the task are loaded. For example, if the task processes attributes {a, b, c} of a file and the next job processes attributes {b, c, d}, the first task (or sub-task) loads columns a, b, c and the next task (or sub-task) only loads column d. However, in general, only a horizontal partition of these columns is actually loaded into the database, since loading an entire column is not invisible to the user. In some embodiments, the current subject matter can be configured to logically break down large data sets into smaller splits or subsets in order to define horizontal partitions which can be equivalent to some fraction of these splits.

To support incremental loading of attributes into a database system, a column-store database systems can be utilized (e.g., backend DBMS). Examples of such DBMS include but are not limited to, MonetDB, InfoBright, etc. As data gradually migrates from the DFS into the database systems, data processing tasks are redirected to access pre-parsed horizontal data partitions from the database for their input instead of scanning and parsing data from DFS. Hence, as more jobs access the same data set, more of it is migrated to the database, resulting in performance improvements due to efficient data access. In some embodiments, the catalog 106 can be configured to keep track of the loading progress and store information about attributes and splits of the DFS files that exist in the database.

As stated above, although the current subject matter is not limited to it, some data processing tasks can include MapReduce ("MR") jobs. As such, the following is a discussion of MR jobs and how such jobs are written and executed. This discussion is provided here for illustrative purposes and is not intended to limit the current subject matter in any way. The main components of a MR job are its map and reduce functions. A map function processes one key-value pair at a time to produce zero or more key-value pairs (for traditional structured data, input key-value pairs correspond to tuples). On each Hadoop node, a Map task executes the map function over an individual split of the data set. If a reduce function is specified, the key-value pairs produced by the Map tasks are sorted and shuffled by key across one or more Reduce tasks. Optionally, close procedures within the Mapper or Reducer implementation can be configured. A Map task executes the configure procedure before the map function. After the map function consumes its entire data split, the close procedure is executed.

MR job can be configured by specifying (i) the number of Map and Reduce tasks to run, (ii) the data set to process, which could be one or more files that are managed by the Hadoop Distributed File System (HDFS), (iii) and the InputFormat to use. The InputFormat determines how a data set is split and, at a very low level, determines how to read in the contents of a file. For example, a TextInputFormat reads text files and produces key-value pairs for the map function, where the value is a line of text and the key is the byte offset of the line. Since InputFormats usually do not provide much parsing functionality, parsing is typically intermixed with data processing in map functions.

Referring to the current subject matter, in some embodiments, the invisible loading system can be a polymorphic data processing task InvisibleLoadJobBase ("IL task"), that serves to conceal the process of data loading. In some embodiments, the task is configured to implement parsing and processing functions of map (and optionally a reduce function) or any equivalent thereof. The data parsing task can be self-configuring and it further modifies its behavior as data migrates from the file system to the database systems. The following is a discussion of each aspect of the IL task. The IL task's aspects include leveraging parsing code of the data processing task, incrementally loading attributes as they are processed, and loading parts of the data set. In some embodiments, the system can be configured to include two components: a framework in which user programs can run and a database backend. The loading instructions can be issued by the framework. The database backend can manage the loading of data into appropriate tables. In some embodiments, the data can be parsed anyway and appropriate instructions for loading of data can be issued to the database backend.

Figure 5A:
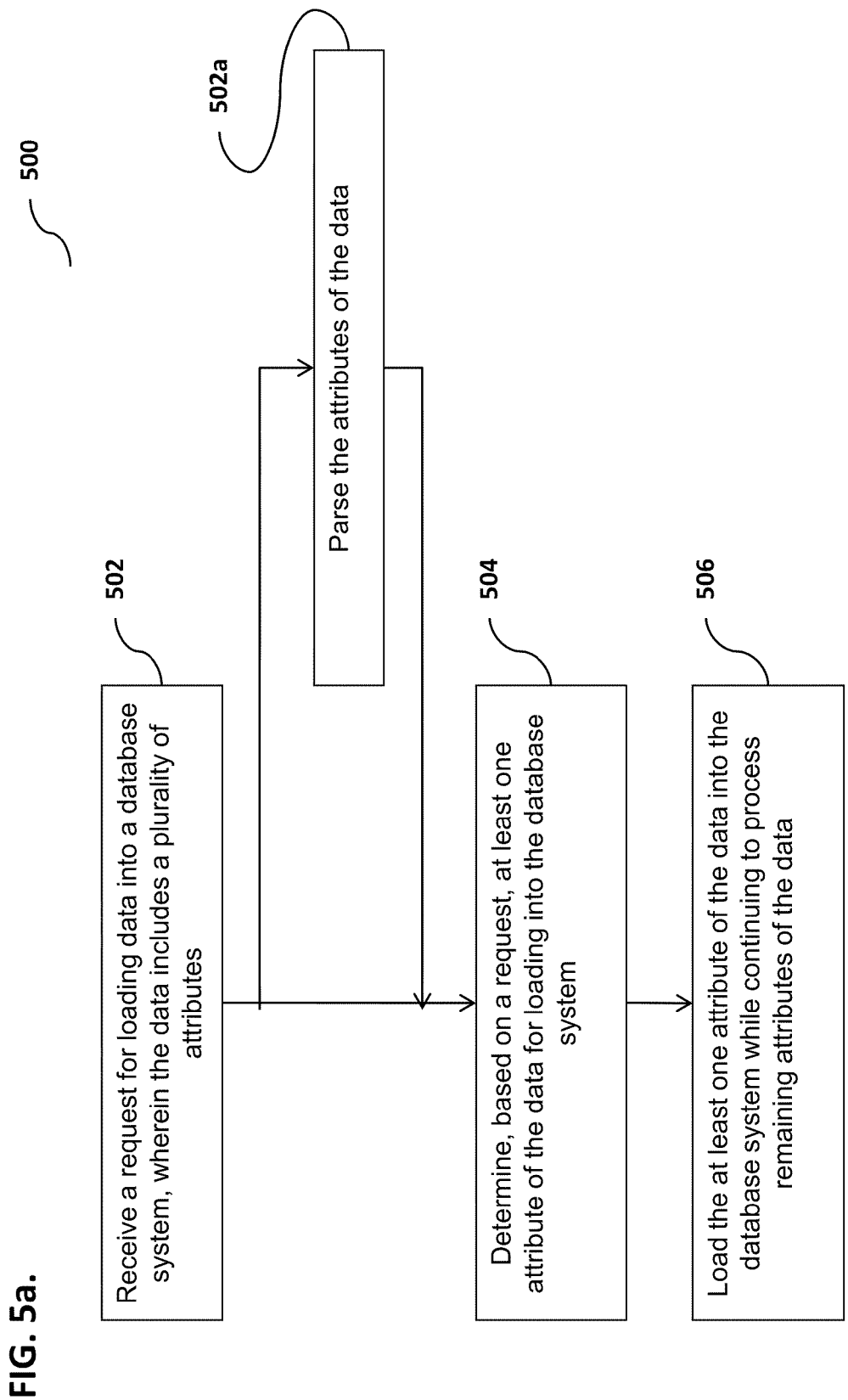
FIG. 5a is a flow chart illustrating an exemplary method for processing data, according to some embodiments of the current subject matter.
Figure 5B:
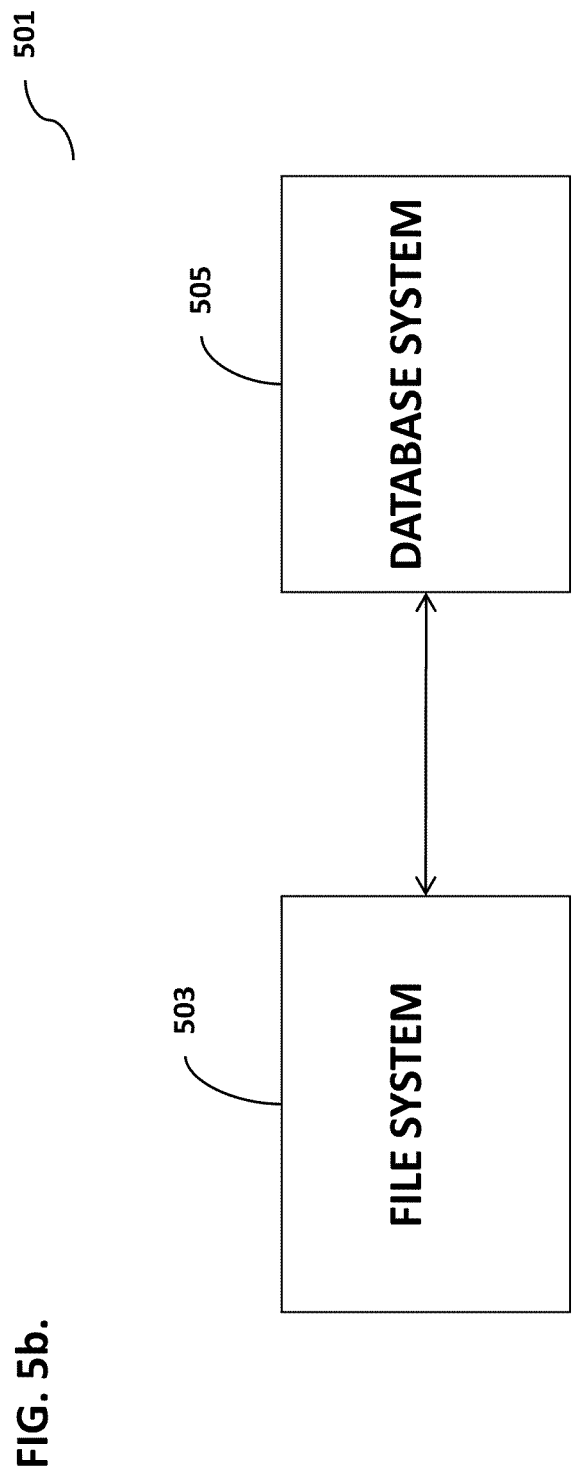
FIG. 5b is a block diagram illustrating an exemplary data processing system configured to perform the method for processing data shown in FIG. 5a and transfer data from a file system to a database system, according to some embodiments of the current subject matter.
Figure 5C:
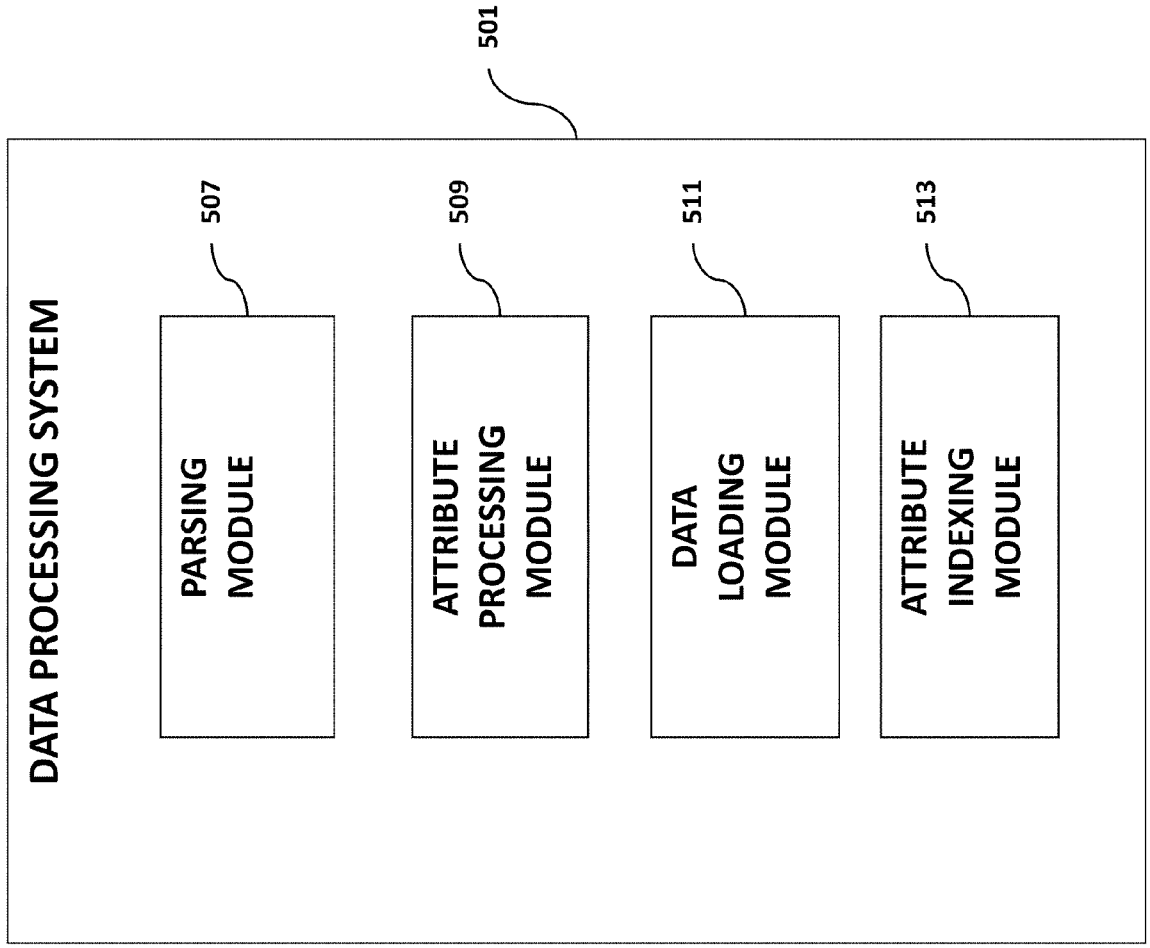
FIG. 5c is a block diagram illustrating further detail of the exemplary data processing system shown in FIG. 5b.
Figure 5E:
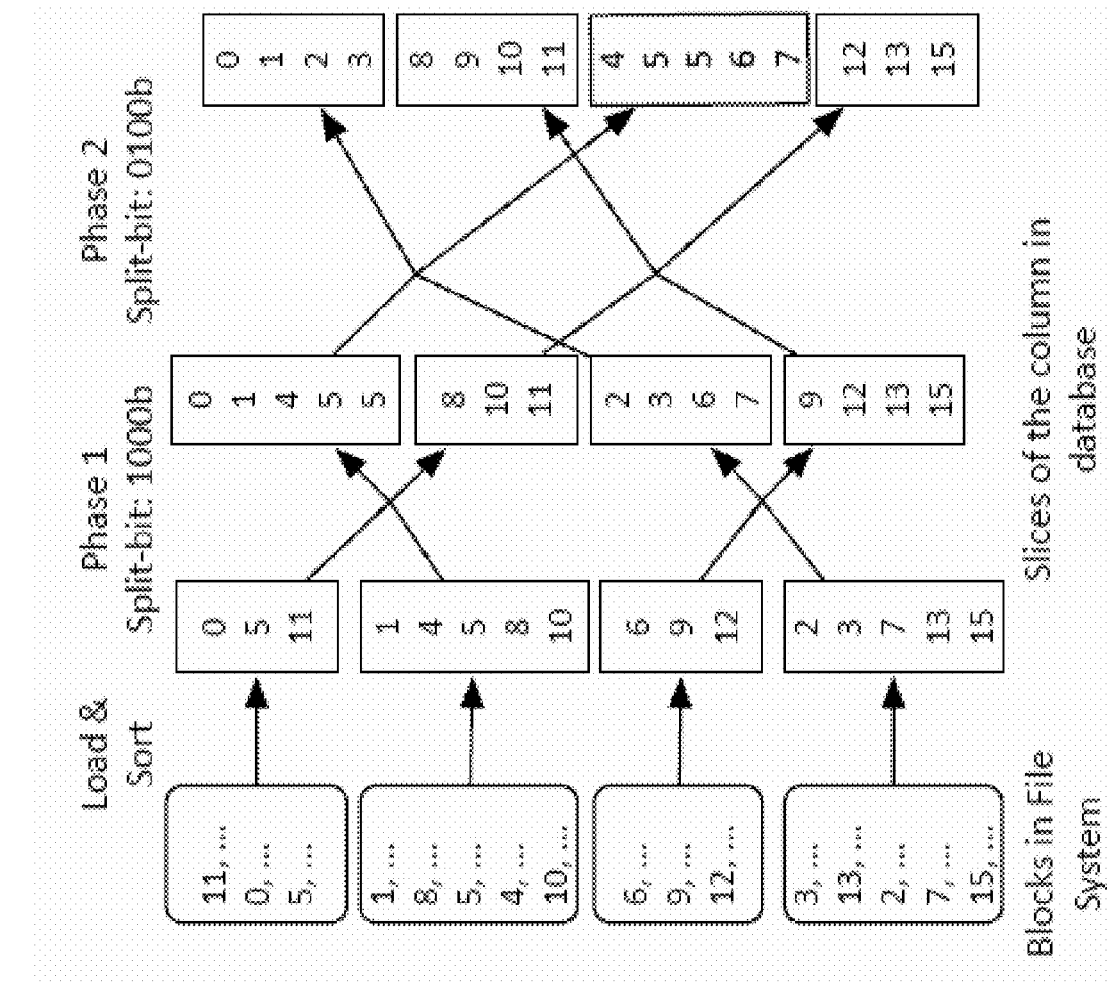
FIG. 5e illustrates an exemplary application of the incremental merge sort method shown in FIG. 5d.

FIG. 5a is a flow chart illustrating an exemplary method 500 for processing data, according to some embodiments of the current subject matter. The method 500 can be configured to be performed by the data processing system 501 and transfer (or load) data from a file system 503 into a database system 505 (schematically shown by an exemplary block diagram in FIG. 5b). A request for loading data into a database system, where the data includes a plurality of attributes, can be received, at 502. The received request can include, but is not limited to, an initial or subsequent load of data and/or any receipt of a data access request, a query, or any other request. The request can be a MapReduce job, a task, a process, a script, or any other type of request that can be issued for loading of data. At 502a, attributes can be parsed from the received data. In some embodiments, the parsing of attributes can be performed as part of the received request. To perform loading by leveraging the parsing code, in some embodiments, involves injecting a "load" statement (at 506) in between the parsing (at 502a) and processing (at 504) phases of method 500. In some embodiments, such parsing and processing phases can be implemented during a map function of a data processing task (e.g., a MapReduce task). The parsing phase (at 502a) includes parsing attributes from the data, e.g., an input tuple. The processing phase (at 504) includes determining which attributes should be loaded into database and which attributes should be indexed. In some embodiments, the loading (at 506) can be configured to occur simultaneously with query processing operations (i.e., loading and parsing data). Thus, as soon as an input tuple is parsed, the parsed attributes of the tuple are loaded into the database and then the system continues to process the tuple. In some embodiments, this allows for different processing operations over the same file, such as accessing data, to push processing into the database systems when possible, while accessing partially loaded attributes. While accessing loaded and unloaded attributes of an accessed file, such processing operations are capable of incrementally loading missing or unloaded attributes of the file into the database systems. In some embodiments, a column-store technique can be implemented to provide for such loading of missing attributes. Referring to FIG. 5c (an exemplary block diagram of the various components of the system 501 for processing data), the parsing of attributes (at 502a) can be configured to be performed by a parsing module 507 of the data processing system 501. The attribute processing module 509 of the system 501 can be configured to perform the processing at 504. The loading (at 506) can be performed by the attribute loading module 511. Once the attributes are loaded into the database system, an attribute indexing module 513 can be configured to perform indexing of the attributes (whether loaded during the initial processing or loaded into the database system during a subsequent data access), as discussed below.

There are several ways to insert such "load" statement. One of the ways is to perform a complex static code analysis to differentiate the parsing from the processing code segments of a map function and then rewrite the function to parse, load, process. Another approach is to impose a parse-process structure on IL tasks. In some embodiments, the IL task can be configured with a parser object that reads in an input tuple, extracts the attributes from the tuple relevant for the analysis, and returns these attributes through an interface (e.g., "getAttribute" interface). Then, the map function can be configured to take in, as input, the parser object instead of the usual key-value pair. The IL task can be further configured to manage the flow of input tuples through the parser object into the load process and finally into the map function. Examples of such parsing process include, but are not limited to, "LOAD . . . USING<parser>AS . . . " and "EXTRACT . . . FROM . . . USING<parser>".

In some embodiments, the load statement can be configured to be injected directly or on a delayed basis. In directload embodiments, the parsed attributes of every input tuple can be immediately loaded as soon as they are scanned and parsed. In some embodiments, the direct load can be utilized if the underlying database system enables efficient streaming inserts. After the map function consumes all inputs, the close procedure can be initiated. In a delayed load embodiment, the parsed attributes can be written into a temporary memory buffer and the close procedure can follow. In some embodiments, the close procedure can be configured to include a SQL 'COPY' command to append the temporarily stored file from the memory buffer into the database table. In some embodiments, the close procedure can be configured to update the catalog with information about the DFS splits and the attributes loaded, as well as, the Parser implementation used to extract the attributes. In some embodiments, database systems can allow a tuple-by-tuple load that can be as efficient as a single block load.

After the data is loaded, following IL tasks that access data sets already loaded in the database, using a parser found in the catalog, retrieve data from the database systems instead of DFS. In some embodiments, every IL task can be configured to check the catalog to determine, which DFS file splits and attributes have been loaded into the database systems. If the required data has been loaded, the IL task can be self-configured to read its input from the database. Since data can be pre-parsed, the IL task can be further configured to replace the parser object with a dummy parser.

Once the parsing code is leveraged, the current subject matter is configured to incrementally load attributes as they are processed (as opposed to loading all attributes), which are extracted by the parser. Since the catalog contains information on the loaded attributes, the IL task utilizes this information to determine, which attributes, if any, need to be loaded into the database. If new attributes need to be loaded, the configure procedure of each data processing task issues an "ALTER TABLE" command to modify the database schema. In some embodiments, using this database schema, as soon as a data set is accessed by a particular parser, a corresponding table is created in the database with the name of the database and the parser.

In some embodiments, user defined parsers can be configured to include a parser interface having two functions: parse (key, value) and getAttribute(id). The parse function reads in the key-value pair produced by the input format and extracts the different attributes, which are then accessed by the getAttribute function. Given a tab-delimited data set, a TabParser can be configured to parse a line of text and break it apart into different attributes which are maintained internally in an array. To get the first attribute, getAttribute(0) function is called.

Since parsers associate numeric identifiers with attributes, each loaded attribute has a parser id:

---
Table name: <file_name>_<parser_name>;
Schema: (0 <type>, 1 <type>, ..., n <type>);
---

The catalog can be configured to maintain a mapping between data set and one or more tables that contain data loaded from the data set but were extracted using different data sets.

Referring to the example discussed above (i.e., two IL tasks are executed in sequence, the first job processes attributes a, b, c and the second job processes b, c, d), when the first job terminates, the database is loaded with attributes a, b, c and the catalog reflects the current database state. When the second job executes, it examines the catalog and intersects the set of loaded attributes with the set of attributes it processes and determines that attribute d needs to be loaded. It, then, self-configures its load operations to only load attribute d. An example of the configure procedure includes "ALTER TABLE . . . ADD COLUMN (d, . . . )".

In some embodiments, to efficiently add a column filled with data to an existing table, a column-store technique or functionality is used. A traditional row-oriented database physically stores attributes of a tuple consecutively. A column-store, however, does not need to physically restructure the table as each column is stored separately.

Once the incremental loading of attributes is complete, the system of the current subject matter proceeds to load parts or fractions (i.e., horizontal partitions) of the data set per data processing task. In some embodiments, because the entire data set is not loaded in a data processing task, a fraction of a data set is loaded into the database from DFS. Hence, every time an IL task accesses the data set, a system-configured fraction of the data set is migrated from DFS to the database. Each IL task can be configured to draw its data from both DFS and the database. As more data is loaded, more data is retrieved from the databases and less from DFS, until the data set is completely loaded. The IL task uses the catalog to self-configure which splits are read from DFS and simultaneously loaded, which splits are read from DFS but not loaded, and which splits are read from the database. The following is an exemplary, non-limiting illustration as to how an IL task manages reading data from two different data sources.

In some embodiments, an IL task can be configured to utilize two InputFormats: one specified by a user and the one that reads data from single-node databases. An IL determines which splits should be processed from DFS. For exemplary purposes only, assume that the data set is structured as a sequence of files, where each file is processed as a single logical split by Hadoop. The equivalence of a file and a split enables working on file names rather than splits. The first time, a user executes the job, all splits in HDFS are processed. A pre-configured fraction of these splits is loaded into the single-node databases as described above. The catalog is updated with information about the loaded splits. The next time the job is executed, the IL task self-configures itself to read the catalog and determine which splits to load and add. If a fraction of the splits are loaded, some data is read from the database, some data is read from DFS and loaded into the database simultaneously and the rest is read from DFS. If all splits are loaded, no splits are read from HDFS, all slits are filtered out, and all the data is read from the database.

The current subject matter's systems and methods can be configured to perform incremental data reorganization through an incremental sort technique discussed below. The following discussion of conventional optimization techniques implemented in traditional databases is provided here for illustrative purposes only and is not intended to limit the scope of the current subject matter. To perform an optimization, a database administrator can determine which indices are necessary given the current query workload. Index selection is a hard database design problem—wrong selection of indexes can result in poor query execution plans and high data update costs. Moreover, ad-hoc queries complicate an administrator's task. To address this problem, self-tuning databases monitor query workloads and query execution plans and create or remove indices in response. Traditional indices, however, offer an all-or-nothing service: until data can be completely indexed, no data access benefits exist, and while data are being indexed, the overhead of indexing either interferes with the query execution or brings querying to a standstill (if data needs to be locked). In addition, complete index creation can take days to complete depending on the size of the data set.

Some recent research efforts have focused on creating incremental, automatic indexing strategies, which include database cracking (See, e.g., S. Ideros, et al., "Database cracking", CIDR '07, pages 68-78, 2007). Database cracking reorganizes data in an automatic, incremental, query-driven fashion. When a selection query is issued against a column, a cracker column is created and optimized for the selection range. Data is partitioned, or cracked, across the range and all values within the selection range are contiguous. The cracked pieces contain disjoint key ranges and within each piece data are unsorted. A cracker index maintains information on the key range of each piece. A key property of cracking is that key ranges that are never queried are never partitioned. However, heavily querying a specific range with different sub-ranges will create smaller pieces with finer grained key ranges that are better represented in the cracker index. If all key ranges are equally likely to be queried, cracking behaves like a drawn-out quicksort, where each query makes, as a side effect, some progress towards ordering the data. Sideways cracking deals with selection queries across multiple columns (see, e.g., S. Ideros et al., "Self-organizing tuple reconstruction in column-stores", SIGMOD '09, pages 297-30, 2009). The basic idea is to utilize cracker maps that ensure the projected attributes are aligned with the selection attribute by replicating tuple movements that occur in the selection column onto the dependent columns. However, "database cracking" technique is inefficient.

The current subject matter can be configured to solve various problems associated with the prior incremental data reorganization techniques, including "database cracking" In some embodiments, the current subject matter can implement an incremental merge sort data reorganization method in conjunction with the invisible loading method. The incremental merge method can integrate compression with reorganization, achieve a complete ordering, and tolerate variable-width data (which are the properties lacking in the prior techniques). In some embodiments, the method can be configured to slice or divide a column into portions and sort the individual slices/portions. Subsequent to "slicing", the method proceeds in phases. Each phase has a fixed number of merge operations. A merge operation merges two slices and splits the merged slice into two slices/portions of disjoint ranges that replace the original slices/portions. Every selection query results in a complete merge operation. At the end of each phase, the entire data set is sub-divided into disjoint ranges. Once the method can achieve a complete ordering, no further merging or splitting occurs. FIG. 5$d$ is a block diagram illustrating an exemplary incremental merge-sort method 520, according to some embodiments of the current subject matter. Data having a plurality of blocks or portions is received (at 521). At 523, the data is sorted within each block or portion. Then, each data block or portion of data (e.g., a column in a table of stored data) is subdivided into a plurality of smaller portions (at 525). At 527, the two divided smaller portions are merged together. Then, the data is ordered in the merged divided portions, at 529. Once, the data is sorted, it is again divided into a plurality of disjoint ranges of data, at 531. The sorted divided portions then replace original portions of data as obtained at 525 (at 533). If a complete ordering of data is achieved on the first pass (at 535), then the ordered data set is outputted, at 537. If not, then the processing returns 525 and the divide-and-merge techniques are repeated. FIG. 5$e$ illustrates an exemplary incremental merge-sort method 520 in accordance with some embodiments of the current subject matter executed over four slices of data in a range of [0, 15].

In some embodiments, the incremental merge sort method can include the following steps:
  Partition the column in a table into k sorted slices. In some embodiments, such partitioning can mimic the block layout of data in DFS, where large files are broken down into smaller blocks. During initial loading step, a one-to-one relationship between blocks and sorted slices can be maintained for that purpose. After sorting each slice, the range of the data, i.e., the smallest and largest value. From this range, a split-bit for the first phase of incremental merge sort is calculated. This is equivalent to the highest power of two that is less than the largest value. Thus, if the data range is [0,15] (See, FIG. 5$e$), the split-bit is $8_{10}$ or $1000_2$.
  Process log k phases of k/2 merge and split operations that process on average 2*n/k tuples. Then, a merge operation is performed by splitting the results into two new slices based on whether the logical bitwise AND of the tuple and the split-bit is 0 or 1. Once this phase is complete, the split-bit is right-shifted (or divided by two), for the next phase (See, FIG. 2$e$). This ensures that the two newly created slices represent disjoint ranges where one key range is larger than the other. At the end of the first phase, exactly half the slices contain key ranges larger than the split-bit—this represents a major partition in the data: slices from one partition need not be merged with slices of the other partition as they do not overlap. At phase p, where p∈[1, log k], a slice i, is merged with slice i+p, if i has not already been merged.
  After k/2*log k steps, the data is completely ordered with each slice containing a contiguous data range. A simple index holding only k entries describes the distribution of key ranges in each slice. (See, FIG. 5$e$).

In alternate embodiments, an adaptive incremental merge sort method can be implemented that performs the exact steps of the incremental merge sort method, but in a different order, and may choose to indefinitely delay some data reorganization steps. This way only merge-split operations on the slices that contain data ranges that overlap with the selection query range are performed. Assuming that a column contains unique values in the range [0, 15] and is organized into eight slices and that a query values are in the range [3, 4], then adaptive incremental merge sort proceeds as follows:

The first phase of merge operation will merge-split all slices as usual and at the end of the phase there are four slices containing values in the range [0, 7] and another four with values in the range [8, 15].

Since selection ranges now overlap with only four of the slices, the next phase only merge-splits four slices, instead of eight. Similarly, the next merge phase will only merge split two slices, those that overlap with the range [0-4].

The remaining slices are left as is without further reorganization until a future selection query selects a range that overlaps with the range of data in these slices.

In this way, merge steps are query-driven and the distribution of value-ranges across the slices is optimized for skewed workloads.

Referring back to the incremental merge sort method 520, in some embodiments, a simple range index can be configured to keep track of the ranges contained in every slice. All loaded columns are physically aligned via multi-column merges. An address column can be created to maintain the relationship between tuples and their representation in the file system. This is necessary, to allow unloaded attributes to be aligned with loaded attributes.

In some embodiments, a selection predicate determines which column can be used to organize the entire data set, where this column is determined at the time of data loading using a filtering predicate. For example, if the first job processes tuples with attributes a, b, c, d that pass a selection predicate on a, then the data set is ordered on attribute a. If another job processes tuples with attributes b, d that pass a predicate on b, a physical copy of columns b, d is created and these columns are incrementally ordered on b.

EXAMPLES

The following is a discussion of some exemplary experiments implementing the invisible loading and incremental sort concepts discussed above. These experiments and their results are provided here for illustrative purposes only and are not intended to limit the scope of the current subject matter. FIG. 6 is a table illustrating various exemplary loading strategies that the inventors implemented during the course of these experiments.

These experiments demonstrated that a complete load and sort (SQL Pre-load) of the entire data set into the database system incurs a significant performance overhead. During the experimentation, the fraction of data loaded per MapReduce job was varied along two dimensions: vertically, (i.e., only load a subset of the parsed attributes) and horizontally (i.e., only load horizontal partitions of the data set). To attain invisible performance, a combination of vertically- and horizontally-partitioned loading was necessary.

The short- and long-term benefits of each approach as measured by query response time and cumulative effort respectively were evaluated. The experiments consisted of a sequence of MapReduce Jobs that perform similar analysis repeatedly over the same data set. A change in the data access pattern was introduced by analyzing a different but overlapping set of attributes and performance of different strategies was evaluated. Incremental merge-sort data reorganization strategy was also evaluated. The strategy was compared against pre-sorting and an alternative (in-memory) incremental reorganization scheme, i.e., database cracking. This set of experiments was run entirely within the database without the overhead of MapReduce.

A. Experimental Setup

Hardware:

All experiments were run on a single quad core in-stance with 12 GB of main memory, a single 250 GB disk partition and a single 200 MB RAM disk partition.

Software:

Hadoop (0.19.1) was used to evaluate the performance of MapReduce executing over a distributed file system (HDFS). HadoopDB over MonetDB 56, an open source column-store database, was used to evaluate the data loading and reorganization strategies. All IL tasks utilized a library of basic functions: a TabParser, and a Filter function. The maximum number of concurrent Map or Reduce tasks was set to one. This restriction was imposed to enable accurate profiling of the systems involved without the overhead of processes competing for I/O or memory resources. All systems were injected with appropriate profiling statements to keep track of the precise time spent in loading, sorting, merging, scanning or selecting data.

Data Set:

The data set consists of five integer attributes and a total of 107,374,182 tuples. The attributes consist of randomly generated positive integers. In 32-bit integer representation, the binary size of the data set is 2 GB. In HDFS, the data are contained in 32, tab-delimited, text, files of 192 MB each (a total size of 6.1 GB). HDFS block size is set to 256 MB, hence each Map task processes an entire 192 MB split.

B. Loading Experiments

1. Selecting Two Attributes

The first experiment modeled a scenario where a simple MapReduce job was written to process two attributes ($a_0$, $a_1$) from an HDFS file, including a selection predicate on $a_0$, where $a_0$ lies in the range [lo-hi]. The range resulted in selecting 10% of the data. A TabParser was used to extract the first and second attribute and filter out the required data. The same job was re-executed with different ranges. The ranges were randomly selected but maintained 10% selectivity. The first three strategies from FIG. 6, Table 1 did not involve any further data loading operations and the filter operation was pushed entirely into the database layer. With invisible loading strategies, as more queries were executed, more parts of the data were loaded. IL tasks processed data from both HDFS and DBMS: loaded data was processed in the database and the remaining data was processed within the MapReduce framework.

Figure 7:
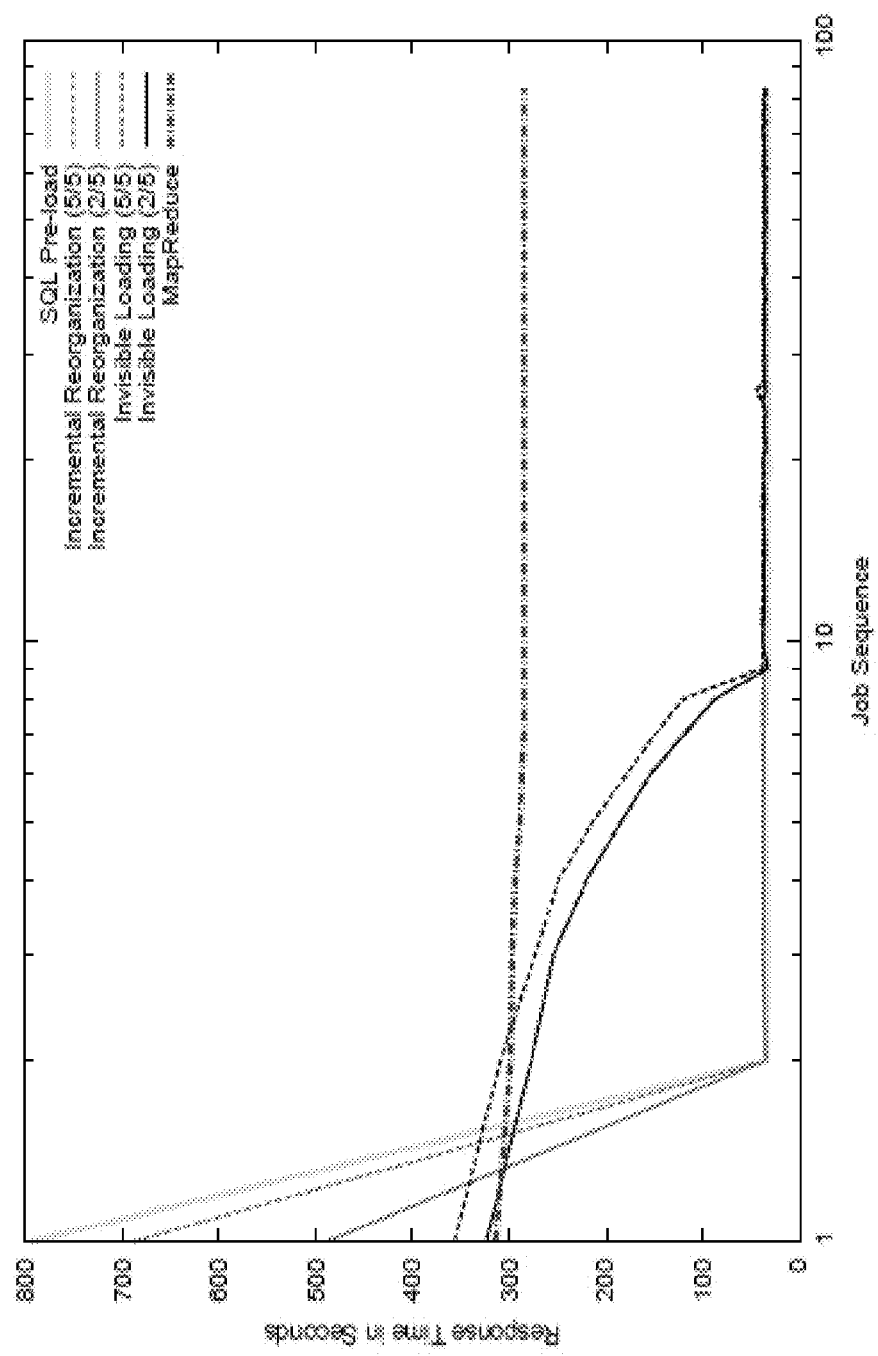
FIGS. 7-9 illustrate exemplary experimental results conducted using the current subject matter's systems and methods in comparison with conventional systems and methods.

FIG. 7 shows response times as a sequence of range selection jobs were executed. The first job represented a "cold start": caches and memory were cleared and HDFS read files from disk into memory. The remaining jobs were "hot executions": all required data was contained within the 12 GB main memory.

A complete data pre-load and organization led to the worst initial response time of about 800 seconds. The baseline MapReduce response time was 300 seconds. From 800 to 300 seconds, each loading strategy dropped a certain amount of loading and reorganization work. First, loading all five columns into 32, individually sorted, database partitions led to a query response time of 680 seconds. This 120-second decrease was due to relaxing the constraint of completely sorting the data at one go. Instead, each partition was ordered by $a_0^7$. Only after 80 selection queries were issued, a complete ordering was achieved. An additional 200-second decrease in response time would have been gained, if only the two queried attributes, $a_0$, $a_1$, were loaded instead of the entire data set. Not only was the size of data smaller, but the number of column alignment operations per partition was reduced from five to two.

As stated above, invisible loading implies that a user does not recognize any major slowdown in the initial query. Invisible loading loads a small fraction of data per job. As seen in FIG. 7, loading ⅛th of the data set, or four partitions per job, dropped the initial query response time to 350 seconds. If only two attributes were loaded, the response time became 310 seconds, or 3% more than the baseline MapReduce time. By the second query, response time was lower than MapReduce as ⅛th of the data was now processed in the database at a much faster rate than MapReduce. By the eight query, ⅞th of the data was loaded in the database and the last four partitions were processed by MapReduce while being copied into the database. Incremental reorganization happened along with the loading. Thus, a complete ordering was achieved after 80 queries were issued.

Once data was loaded into the databases, query response time stayed within 35 seconds regardless of whether the database was physically reorganizing the data or not. This is because, at 10% selectivity, the overhead of MapReduce overwhelmed the query response time. A merge operation of two partitions consisting of two columns only took 450 milliseconds, and a selection operation took about 750 milliseconds on average.

Figure 8:
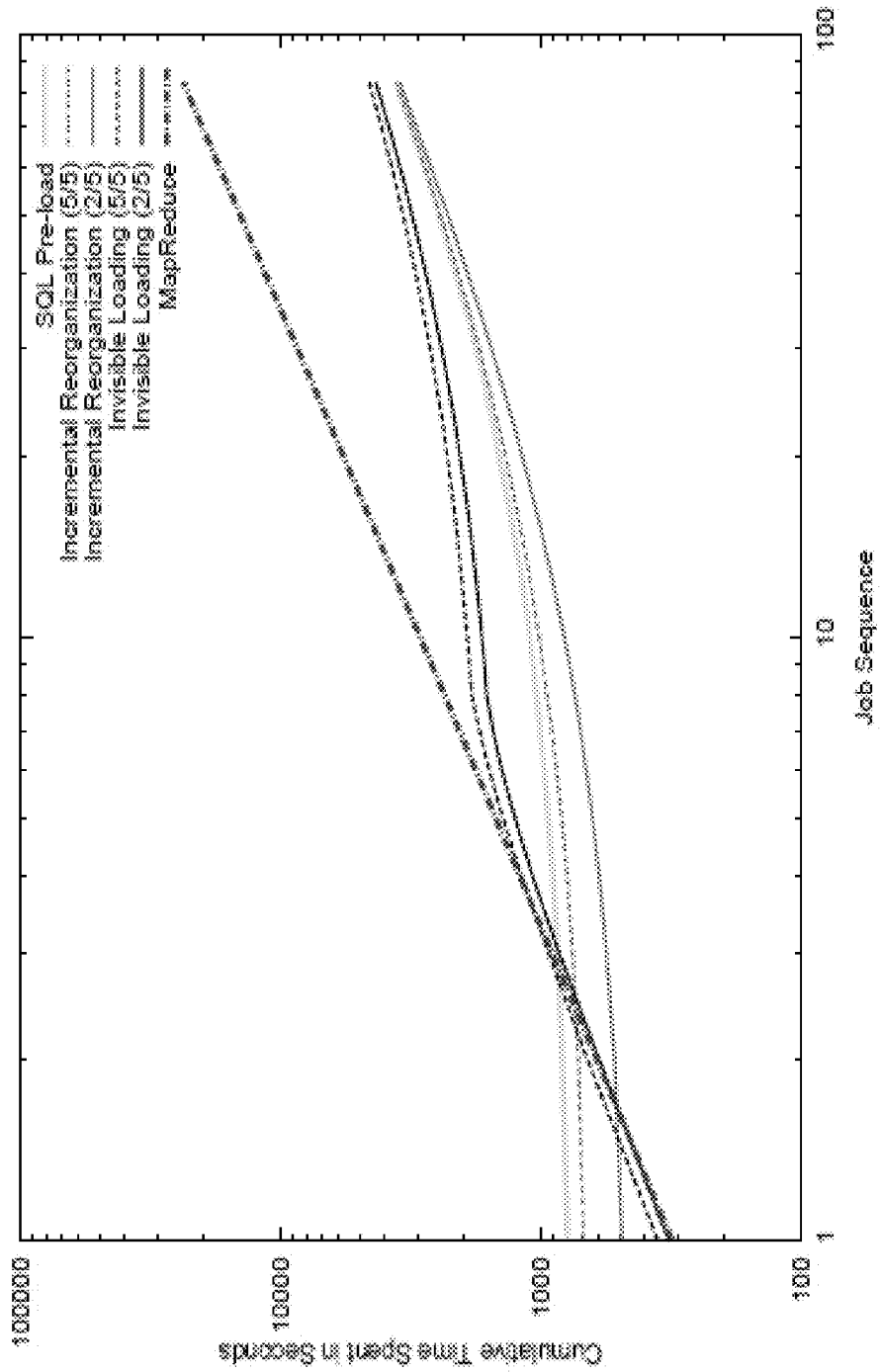

As shown in FIG. 8, the cumulative "cost" of executing MapReduce jobs, that scan and parse in a brute-force fashion the entire data set without any progress towards preparing the data for future workloads, was an order of magnitude higher than any of the five data loading strategies after only eighty jobs. Invisible loading does not have the high upfront costs of pre-loading. However, the initial processing work that was distributed between MapReduce and databases until the data was fully loaded caused invisible loading to have a higher cumulative "cost" than the alternative strategies. The incremental reorganization method started lower than a complete pre-load, but eventually converged to have the same cumulative effort. This result strongly supports a hypothesis that completely reorganizing data once has little cumulative benefit over incrementally doing so, especially with analytical-type queries that access large segments of the data. Finally, loading only two out of five attributes always led to a better cumulative effort if none of the three unloaded columns were ever accessed.

C. Reorganization Experiments

The aim of the reorganization experiments was (i) to analyze the behavior of three different data reorganization strategies, cracking, incremental merge-sort, and presorting, and (ii) to evaluate the benefit of integrating lightweight compression (RLE) with data reorganization as the cardinality of data decreases. All experiments were executed completely within MonetDB and assumed the data has been loaded.

For these experiments, three data sets each with a single column of 108 integer values were generated. Each data set included different data cardinality. The first, high cardinality, data set included 20% unique values. Values were selected uniformly at random from the range [0, 2×107). The second data set included of 1% unique values selected from the range [0, 106). The, third, low cardinality data set had 0.1% unique values, with values selected from the range [0, 105). For each of the data reorganization techniques, a sequence of 1000 aggregation queries was executed. Each query selected a random range with fixed selectivity, and then summed all the values within the range. The query selectivity was varied from 0.1% to 10%.

Figure 9:
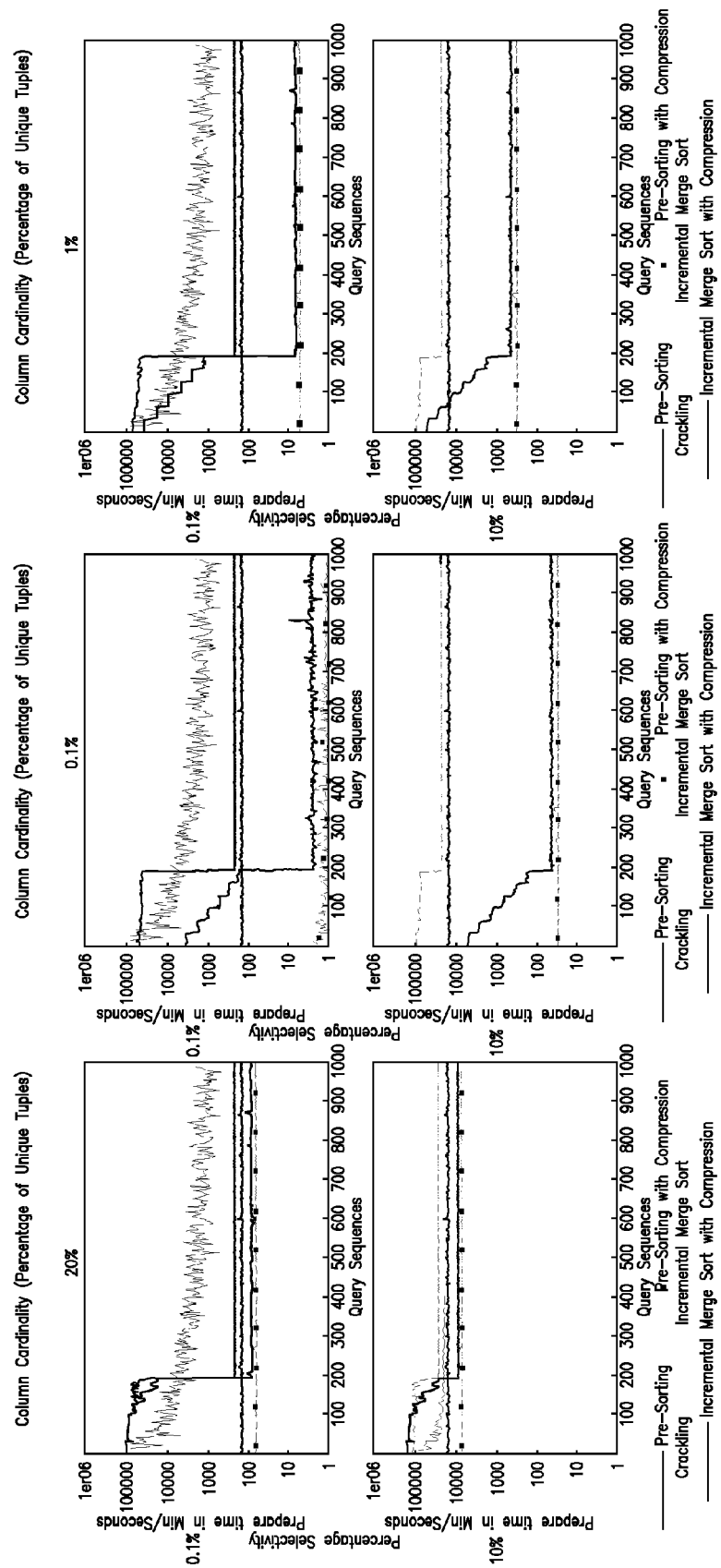

FIG. 9 illustrates a matrix of response time graphs where data cardinality was varied along the columns and selectivity along the rows. Average response times with a period of four to eliminate noise and better highlight the trends were plotted.

1. Performance of Each Reorganization Technique

Presorting:

Since data was presorted, the selection operator executed two binary searches to determine the end-point positions of the selected range, and then returned a view of all the tuples within the two positions. The aggregation operator simply scanned and summed all tuples in the view. Since no further data reorganization was required, the response time remained constant throughout the sequence of 1000 queries. As selectivity increased, the query response time increased proportionally to the increase in the amount of intermediate result tuples that needed to be aggregated.

Cracking:

In all cases, cracking behaved consistently. Query response times initially started at 650 milliseconds and within 10 queries dropped an order of magnitude. Cracking swapped tuples in-place such that all tuples that fell within the selection range were contiguous. A view with pointers to the positions of the first and last tuple in the range was then passed to the aggregation operator.

The first query caused cracking to copy the data into a new column, the cracker column, and hence it was the most "expensive" query. Consecutive queries partitioned the column across the selection range. As cracking continued, tuple movements were usually confined within the boundaries of smaller sub-partitions of the column. Hence, query response times decreased. As selectivity increased, the overall query response time increased. This was due to the increase in the amount of intermediate result tuples that needed to be aggregated.

Incremental Merge Sort Method:

At loading, data was sliced into 64 individually sorted slices. Six phases of 32 merge steps each were executed. Therefore, the entire data set was completely ordered by the 192nd query and an observable drop in query response time occurred then. At each merge step, two slices, of roughly 1.5 million tuples each, were merged and split. Since, the amount of reorganization work performed at each merge step was roughly equal, query response times remained roughly constant. There was a slight, gradual decrease in response time as the column morphed into slices of tight, disjoint ranges—the selection operator used a range index to access slices that overlapped with the selection range, instead of accessing all slices.

Once data was completely organized, query response time approached presorted response times. This is because a sliced column organization was maintained. Thus, if the selection range spans multiple slices, the selection operator result set will include non-contiguous tuples and the aggregation operator navigates through multiple selection views instead of a single view.

2. Effect of Compression on Response Times

Presorting with Compression:

a simple RLE compression operator was implemented in MonetDB that associates every value in a column with a count of the number of times it appears consecutively. Since data was sorted, the compressed column contained distinct values and associated counts. A sum aggregation operator operated directly on RLE encoded data without decompression.

With compression, the query (i) searched through less data, (ii) produced a compressed intermediate selection result-set, and (iii) took advantage of the RLE format when aggregating data (i.e., there is no decompression overhead). Therefore, query performance with pre-sorted and compressed data was better than with pre-sorted and non-compressed data. As the data cardinality decreases, the amount of data that was processed decreased proportionally, hence query response times decreased proportionally.

Incremental Merge Sort Method with Compression:

FIG. 6 illustrates two trends: (i) with high cardinality, 20% unique tuples, integrating compression with the current subject matter's data reorganization strategy is initially "costly" in terms of query response time, (ii) query response times descend in a "stepwise" fashion.

Before the first query was issued, all 64 slices were individually sorted and run-length encoded. When data cardinality was high, the average run-length of values in each slice was one. Since RLE associated an extra count with every value, the RLE-encoded slices occupied more space than non-encoded slices. Thus, initially integrating compression with incremental merge sort method was expensive on high cardinality data sets. However, as soon as the average run-length started to increase, due to merging slices, the performance of compressed incremental merge sort improved and outperformed its non-compressed variant. At higher compression ratios, compressed incremental merge sort method outperformed database cracking, non-compressed incremental merge-sorting and non-compressed presorting throughout the entire sequence of queries, because it reorganized and processed less data.

The stepwise descent in query response time occurred at the end of every merge phase. At the end of every phase, the average run length of every value doubled and the size of the column was nearly halved. Hence, the next merge phase merged exponentially less data and query response time decreased exponentially.

These experiments illustrated various advantages of the systems and methods of the current subject matter:
- Invisible Loading poses no burden on MapReduce jobs;
- Invisible Loading makes incremental progress towards optimizing data access for future analysis, yet maintains a cumulatively low price in comparison to performing no data access optimization.
- Incremental Merge Sort performs better than database cracking technique;
- Integrating lightweight compression into incremental data reorganization improves query performance over low cardinality data sets.

In some embodiments, frequency of access of a particular attribute by different users can determine how much of it can be loaded into the database system. Filtering operations on a particular attribute can cause the database system to sort the attribute's column. Thus, as different users submit jobs that access different subsets of the data, the set of loaded columns can diverge from each other in terms of completeness and order.

In some embodiments, the following tools along with address columns and tuple-identifiers ("OIDs") can be used to manage querying of columns at different loading and reorganization stages: (1) address columns can be used to track movement of tuples (as a result of sorting) away from their original insertion positions, and (2) tuple-identifiers can be used to determine how much of a column has been loaded and to align the column with other columns that have different sorting orders. In some embodiments, the following rules can deal with different loading and reorganization states in which different columns can exist:

If columns are completely loaded and sorted with the same order, then the columns can be positionally aligned with each other and a linear merge can be performed when reconstructing tuples from these columns.

Columns that are partially loaded can have their OIDs in an insertion order. To reconstruct tuples from completely loaded (and perhaps reorganized) columns and partially loaded columns, a join can be performed between the address column of the index column and the OIDs of the partially loaded columns.

If a column needs to have a different sorting order, then a copy of that column can be created (along with other dependent columns). An address column can be generated to track movement of tuples from their original insertion orders to their new sorting orders.

The following examples illustrate integration of the loading operations discussed above with incremental reorganization through application of the above rules using case-by-case examples of different combinations of queries from three users: X, Y and Z. In these examples, a data set having four attributes a, b, c, d is used. User X may be interested in attributes $\{\bar{a}, b\}$, where a denotes a selection predicate on a. User Y may be interested in attributes $\{\bar{a}, c\}$. User Z may be interested in attributes $\{\bar{b}, d\}$. The file can have only four splits per node and the horizontal-partitioning fraction is ¼, so at most one split can be loaded per job per node. The number of slices k is equal to the number of splits.

Example 1

XXXX-YYYY

For each X query a horizontal partition of attributes $\{a, b\}$ can be loaded and immediately sorted by attribute a. After four of user X's queries, attributes $\{a, b\}$ can be completely loaded. The hidden address column can track movement of tuples due to: (i) individual sorting of slices by attribute a that occurred after loading each slice, and (ii) merge-split operations that were triggered by a third query as two slices were already may have been loaded by then. Since b is positionally aligned with a, the tuple identifier (OID) values of a, b are not materialized. Query Y can start loading of attribute c. The first query Y can be processed entirely from the file system with a single partition of c loaded into the database. The second Y query can execute the following relational expression in the database system (f(a) is a predicate on a):

$$\pi_{a,c}(\sigma_{f(a)}(a,\text{addr}_a) \propto (oid_c,c)) \quad (1)$$

The OIDs associated with column c can be configured to fall within an address range associated with the first loaded partition. The remaining three splits can be processed entirely over the file system and a second partition can be loaded. All completely loaded columns that depend on a, namely b, can be kept aligned with a. Therefore we make use of the two tuple re-construction techniques: positional alignment when retrieving tuples from a and b and tuple-identifier (OID) matching when retrieving tuples from a and the partially loaded column c. After four of user Y's queries, column c can be completely loaded. The database system then positionally aligns column c with column a and drops its materialized OID values.

Example 2

XX-YYYY-XX

In this example, the first two X queries can cause the system to behave as in case 0. The following two Y queries can load only attribute c from the first two file-splits. Column c can have materialized OID values and is not positionally aligned with column a. The relational expression (1) can be used to query columns a, c. After the third Y query, another partition of attributes a, c can be loaded. The newly added slice of column a can be immediately sorted and the first two loaded slices of a can be merge-split. Since column b is no longer aligned with a, its OID values can be materialized from the address column. After the fourth Y query, a and c can be completely loaded. Column c is then positionally aligned with a, and its OID values are dropped.

Example 3

Example 1|Example 2—ZZZZ

The first query Z can loads a partition of column d into the database system. The second query Z can select tuples {b, d} filtered by b from the loaded database partition of {b, d} using the following relational expression:

$$\pi_{b,d}(\sigma_{f(b)}(b, \text{addr}_a) \propto (oid_d, d)) \quad (2)$$

The selection on column b can initiate an incremental reorganization of column b. A copy of b and the address column can be created—b', addr_b. Column b' can then be sliced, with each slice individually sorted as specified by an incremental merge sort. Column addr_b can keep track of the movement of values within column b'. After the four Z queries, column d can be completely loaded and is positionally aligned with b'. Any future Z queries can be satisfied using columns b', d.

Example 4

XX-ZZZZ-XX

After the fourth Z query, the database system can have a partially loaded column a with an associated address column addr_a. Columns b', d can be completely loaded with address column addr_b. The following X queries can load remaining partitions of attribute a. Equivalent partitions of column b can be copied from within the database system using the following expression:

$$\pi_b(\text{addr}_a \propto (\text{addr}_b, b')) \quad (3)$$

Columns a, b can, therefore, be kept positionally aligned.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, i.e., one or more computer programs tangibly embodied in a machine-readable storage device, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Some of the essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Media suitable for embodying computer program instructions and data include all forms of volatile (e.g., random access memory) or non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other in a logical sense and typically interact through a communication network. The relationship of client and server arises by virtue of computer programs running on the respective computers and having a client-server relationship to each other.

Example embodiments of the methods and components of the current subject matter have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the current subject matter should not be limited by any of the above-described exemplary embodiments, but should be defined only in accordance with the following claims and their equivalents.

What is claimed:

1. A method for processing and transferring data from a file system to a database system, the method comprising the steps of:
   receiving a query containing a request for accessing data from a file system, wherein the request for accessing data identifies a plurality of attributes, each attribute being associated with an object identifier;
   determining, based on the query, whether at least one partition of at least one attribute of the data has been previously loaded into the database system;
   incrementally loading, based on a determination that the at least one partition of at least one attribute of the data has not been previously loaded into the database system, the at least one partition of the at least one attribute of the data into the database system while continuing to process the query without loading all attributes in the plurality of attributes identified by the request at the time of receiving the query, and without loading the at least one partition of at least one attribute of the data into the database system upon determination that the at least one partition has been previously loaded into the database system, the determination is being made based on a catalog containing a mapping of a portion of the plurality of attributes that has been previously loaded into the database system, the at least one loaded partition of the at least one attribute is being stored together with the object identifier associated with the at least one attribute; and
   joining the at least one loaded partition and at least another loaded partition of at least another attribute using the object identifier associated with the at least one attribute and another object identifier associated with the at least another attribute, to generate a dataset responsive to the received query;
   wherein the incremental loading is performed during a map phase of a MapReduce processing task.

2. The method according to claim 1, wherein the receiving further comprises parsing the attributes of the data as a result of the received request.

3. The method according to claim 2, further comprising incrementally loading, based on the request, at least one partition of each attribute of the data into the database system as soon as each parsed attribute is processed.

4. The method according to claim 3, further comprising indexing each processed parsed attribute in the database system.

5. The method according to claim 4, wherein the indexing of the attributes is configured to be performed incrementally as soon as each processed parsed attribute is loaded into the database system.

6. The method according to claim 5, further comprising accessing the received data loaded into the database system;
   determining attributes of the data that have not been loaded into the database system;
   parsing the attributes that have not been loaded into the database system;
   processing the parsed unloaded attributes to determine at least one partition of at least one unloaded attribute for loading into the database system; and
   loading the at least one partition of the at least one processed parsed unloaded attribute of the data into the database system while continuing to process the remaining unloaded attributes of the data.

7. The method according to claim 6, further comprising indexing each loaded processed parsed unloaded attribute in the database system.

8. The method according to claim 1, wherein the loading further includes loading the attributes on the column-store basis, whereby each different column of the received data is loaded independently into the database system.

9. The method according to claim 1, wherein the loading is selected from a group consisting of:
   direct loading, wherein parsed attributes of the received data are loaded into the database system as soon as the attributes are processed, and delayed loading, wherein parsed attributes of the received data are initially temporarily stored in a temporary storage and then loaded into the database system.

10. The method according to claim 1, wherein the loading further comprises
    (a) dividing a column of loaded attributes into a plurality of portions;
    (b) sorting the plurality of portions to obtain a first order of attributes within the column of loaded attributes;
    (c) dividing the plurality of sorted portions of attributes into further plurality of portions;
    (d) sorting the further plurality of portions to obtain a second order of attributes within the column of loaded attributes;
    (e) repeating steps (c)-(d) to obtain a final order of attributes of the data.

11. A data processing system for transferring data having a plurality of attributes from a file system to a database system, the system comprising:
    a processor configured to
      receive a query containing a request for accessing data from a file system, wherein the request for accessing data identifies a plurality of attributes, each attribute being associated with an object identifier;
      determine, based on the query, whether at least one partition of at least one attribute of the data has been previously loaded into the database system;
    a data loader module configured to incrementally load, based on a determination that the at least one partition of at least one attribute of the data has not been previously loaded into the database system, the at least one partition of at least one attribute of the data into the database system while the processor continues to process the query without loading all attributes in the plurality of attributes at the time of receiving the query and without loading the at least one partition of at least one attribute of the data into the database system upon determination that the at least one partition has been previously loaded into the database system, the determination is being made based on a catalog containing a mapping of a portion of the plurality of attributes that has been previously loaded into the database system, the at least one loaded partition of the at least one attribute is being stored together with the object identifier associated with the at least one attribute; and a join module configured to join the at least one loaded partition and at least another loaded partition of at least another attribute using the object identifier associated with the at least one attribute and another object identifier associated with the at least another attribute, to generate a dataset responsive to the received query;

wherein the incremental loading is performed during a map phase of a MapReduce processing task.

12. The system according to claim 11, further comprising a parsing module configured to parse the attributes of the data as a result of the request.

13. The system according to claim 12, wherein at least one partition of each parsed attribute of the data is configured to be incrementally loaded, based on the request, into the database system as soon as each parsed attribute is processed.

14. The system according to claim 13, further comprising an indexing module configured to index each processed parsed attribute in the database system.

15. The system according to claim 14, wherein the indexing of the attributes is configured to be performed incrementally as soon as each processed parsed attribute is loaded into the database system.

16. The system according to claim 15, wherein upon accessing the received data loaded into the database system, attributes of the data that have not been loaded into the database system are determined;
wherein
the parsing module is configured to parse the attributes that have not been loaded into the database system;
the processor is configured to process the parsed unloaded attributes to determine at least one partition of at least one unloaded attribute for loading into the database system; and
the data loader is configured to load the at least one partition of the at least one processed parsed unloaded attribute of the data into the database system while continuing to process the remaining unloaded attributes of the data.

17. The system according to claim 16, wherein each loaded processed parsed unloaded attribute is configured to be indexed in the database system.

18. The system according to claim 11, wherein the loading further includes loading the attributes on the column-store basis, whereby each different column of the received data is loaded independently into the database system.

19. The system according to claim 11, wherein the data loader is configured to perform loading selected from a group consisting of:
direct loading, wherein parsed attributes of the received data are loaded into the database system as soon as the attributes are processed, and
delayed loading, wherein parsed attributes of the received data are initially temporarily stored in a temporary storage and then loaded into the database system.

20. The system according to claim 11, wherein the data loader is configured to
(a) divide a column of loaded attributes into a plurality of portions;
(b) sort the plurality of portions to obtain a first order of attributes within the column of loaded attributes;
(c) divide the plurality of sorted portions of attributes into further plurality of portions;
(d) sort the further plurality of portions to obtain a second order of attributes within the column of loaded attributes;
(e) repeat (c)-(d) to obtain a final order of attributes of the data.

21. A non-transitory computer program product, tangibly embodied in a non-transitory computer-readable medium, the computer program product causing a data processing system for transferring data from a file system to a database system, to perform operations comprising:
receiving a query containing a request for accessing data from a file system, wherein the request for accessing data identifies a plurality of attributes, each attribute being associated with an object identifier;
determining, based on the query, whether at least one partition of at least one attribute of the data has been previously loaded into the database system;
incrementally loading, based on a determination that the at least one partition of at least one attribute of the data has not been previously loaded into the database system, the at least one partition of the at least one attribute of the data into the database system while continuing to process the query without loading all attributes in the plurality of attributes identified by the request at the time of receiving the query, and without loading the at least one partition of at least one attribute of the data into the database system upon determination that the at least one partition has been previously loaded into the database system, the determination is being made based on a catalog containing a mapping of a portion of the plurality of attributes that has been previously loaded into the database system, the at least one loaded partition of the at least one attribute is being stored together with the object identifier associated with the at least one attribute; and
joining the at least one loaded partition and at least another loaded partition of at least another attribute using the object identifier associated with the at least one attribute and another object identifier associated with the at least another attribute, to generate a dataset responsive to the received query;
wherein the incremental loading is performed during a map phase of a MapReduce processing task.

22. The method according to claim 1, wherein the receiving and the determining are performed during the map phase of the MapReduce processing task.

23. The system according to claim 11, wherein the processor is configured to perform the receiving and the determining operations during the map phase of the MapReduce processing task.

24. The computer program product according to claim 21, wherein the receiving and the determining operations are performed during the map phase of the MapReduce processing task.

25. A computer-implemented method for processing and transferring data from a file system to a database system, the method comprising the steps of:
receiving a query containing a request for accessing data from a file system, wherein the request for accessing data identifies a plurality of attributes, each attribute being associated with an object identifier;
parsing at least one attribute in the plurality of attributes from the data;
incrementally loading at least one partition of the at least one parsed attribute;
processing, based on the query, to determine whether the at least one partition of the at least one parsed attribute of the data has been previously loaded into the database system;
loading the data containing the at least one partition of the at least one parsed attribute of the data into the database system while continuing to process the query without loading all attributes in the plurality of attributes identified by the request at the time of receiving the query, and without loading the at least one partition of at least one parsed attributed of the data into the database system upon determination that the at least one partition has been previously loaded into the database system, the determination is being made based on a catalog containing a mapping of a portion of the plurality of attributes that has been previously loaded into the database system, the at least one loaded partition of the at least one attribute is being stored together with the object identifier associated with the at least one attribute; and joining the at least one loaded partition and at least another loaded partition of at least another attribute using the object identifier associated with the at least one attribute and another object identifier associated with the at least another attribute, to generate a dataset responsive to the received query;

wherein the loading is performed during a map phase of a MapReduce processing task.

26. The method according to claim 25, further comprising incrementally loading, based on the request, at least one partition of each attribute of the data into the database system as soon as each parsed attribute is processed.

27. The method according to claim 26, further comprising indexing each processed parsed attribute in the database system.

28. The method according to claim 27, wherein the indexing of the attributes is configured to be performed incrementally as soon as each processed parsed attribute is loaded into the database system.

29. The method according to claim 28, further comprising accessing the received data loaded into the database system;

determining attributes of the data that have not been loaded into the database system;

parsing the attributes that have not been loaded into the database system;

processing the parsed unloaded attributes to determine at least one partition of the at least one unloaded attribute for loading into the database system; and loading the at least one partition of the at least one processed parsed unloaded attribute of the data into the database system while continuing to process the remaining unloaded attributes of the data.

30. The method according to claim 29, further comprising indexing each loaded processed parsed unloaded attribute in the database system.

31. The method according to claim 25, wherein the incrementally loading further comprises loading the attributes on the column-store basis, whereby each different column of the received data is loaded independently into the database system.

32. The method according to claim 25, wherein the incrementally loading is selected from a group consisting of:
direct loading, wherein parsed attributes of the received data are loaded into the database system as soon as the attributes are processed, and
delayed loading, wherein parsed attributes of the received data are initially temporarily stored in a temporary storage and then loaded into the database system.

33. The method according to claim 25, wherein the incrementally loading further comprises
(a) dividing a column of loaded attributes into a plurality of portions;
(b) sorting the plurality of portions to obtain a first order of attributes within the column of loaded attributes;
(c) dividing the plurality of sorted portions of attributes into further plurality of portions;
(d) sorting the further plurality of portions to obtain a second order of attributes within the column of loaded attributes; and
(e) repeating steps (c)-(d) to obtain a final order of attributes of the data.

34. The method according to claim 25, wherein parsing and processing are performed during a map processing task of a MapReduce processing task.

35. A system comprising:
at least one processor;
at least one memory coupled to the at least one processor, the at least one memory storing instructions that, when executed by the at least one processor, cause the at least one processor to perform operations comprising:
receiving a query containing a request for accessing data from a file system, wherein the request for accessing data identifies a plurality of attributes, each attribute being associated with an object identifier;
parsing at least one attribute in the plurality of attributes from the data;
incrementally loading at least one partition of the at least one parsed attribute;
processing, based on the query, to determine whether the at least one partition of the at least one parsed attribute of the data has been previously loaded into the database system;
loading the data containing the at least one partition of the at least one parsed attribute of the data into the database system while continuing to process the query without loading all attributes in the plurality of attributes identified by the request at the time of receiving the query, and without loading the at least one partition of at least one parsed attributed of the data into the database system upon determination that the at least one partition has been previously loaded into the database system, the determination is being made based on a catalog containing a mapping of a portion of the plurality of attributes that has been previously loaded into the database system, the at least one loaded partition of the at least one attribute is being stored together with the object identifier associated with the at least one attribute; and
joining the at least one loaded partition and at least another loaded partition of at least another attribute using the object identifier associated with the at least one attribute and another object identifier associated with the at least another attribute, to generate a dataset responsive to the received query;
wherein the loading is performed during a map phase of a MapReduce processing task.

36. The system according to claim 35, wherein the operations further comprise
incrementally loading, based on the request, at least one partition of each attribute of the data into the database system as soon as each parsed attribute is processed.

37. The system according to claim 36, wherein the operations further comprise
indexing each processed parsed attribute in the database system.

38. The system according to claim 37, wherein the indexing of the attributes is configured to be performed incrementally as soon as each processed parsed attribute is loaded into the database system.

39. The system according to claim 38, wherein the operations further comprise accessing the received data loaded into the database system;

determining attributes of the data that have not been loaded into the database system;

parsing the attributes that have not been loaded into the database system;

processing the parsed unloaded attributes to determine at least one partition of at least one unloaded attribute for loading into the database system; and loading the at least one partition of the at least one processed parsed unloaded attribute of the data into the database system while continuing to process the remaining unloaded attributes of the data.

40. The system according to claim 39, wherein the operations further comprise indexing each loaded processed parsed unloaded attribute in the database system.

41. The system according to claim 35, wherein the incrementally loading further comprises loading the attributes on the column-store basis, whereby each different column of the received data is loaded independently into the database system.

42. The system according to claim 35, wherein the incrementally loading the at least one attribute is selected from a group consisting of:

direct loading, wherein parsed attributes of the received data are loaded into the database system as soon as the attributes are processed, and delayed loading, wherein parsed attributes of the received data are initially temporarily stored in a temporary storage and then loaded into the database system.

43. The system according to claim 35, wherein the incrementally loading further comprises (a) dividing a column of loaded attributes into a plurality of portions;

(b) sorting the plurality of portions to obtain a first order of attributes within the column of loaded attributes;

(c) dividing the plurality of sorted portions of attributes into further plurality of portions;

(d) sorting the further plurality of portions to obtain a second order of attributes within the column of loaded attributes; and (e) repeating steps (c)-(d) to obtain a final order of attributes of the data.

44. The system according to claim 35, wherein parsing and processing are performed during a map processing task of a MapReduce processing task.

45. A non-transitory computer program product comprising non-transitory machine-readable medium storing instructions that, when executed by the at least one processor, cause the at least one processor to perform operations comprising:

receiving a query containing a request for accessing data from a file system, wherein the request for accessing data identifies a plurality of attributes, each attribute being associated with an object identifier;

parsing at least one attribute in the plurality of attributes from the data;

incrementally loading at least one partition of the at least one parsed attribute;

processing, based on the query, to determine whether the at least one partition of the at least one parsed attribute of the data has been previously loaded into the database system;

loading the data containing the at least one partition of the at least one parsed attribute of the data into the database system while continuing to process the query without loading all attributes in the plurality of attributes identified by the request at the time of receiving the query, and without loading the at least one partition of at least one parsed attributed of the data into the database system upon determination that the at least one partition has been previously loaded into the database system, the determination is being made based on a catalog containing a mapping of a portion of the plurality of attributes that has been previously loaded into the database system, the at least one loaded partition of the at least one attribute is being stored together with the object identifier associated with the at least one attribute; and joining the at least one loaded partition and at least another loaded partition of at least another attribute using the object identifier associated with the at least one attribute and another object identifier associated with the at least another attribute, to generate a dataset responsive to the received query;

wherein the loading is performed during a map phase of a MapReduce processing task.

46. The computer program product according to claim 45, wherein the operations further comprise incrementally loading, based on the request, at least one partition of each attribute of the data into the database system as soon as each parsed attribute is processed.

47. The computer program product according to claim 46, wherein the operations further comprise indexing each processed parsed attribute in the database system.

48. The computer program product according to claim 47, wherein the indexing of the attributes is configured to be performed incrementally as soon as each processed parsed attribute is loaded into the database system.

49. The computer program product according to claim 48, wherein the operations further comprise accessing the received data loaded into the database system;

determining attributes of the data that have not been loaded into the database system;

parsing the attributes that have not been loaded into the database system;

processing the parsed unloaded attributes to determine at least one partition of at least one unloaded attribute for loading into the database system; and loading the at least one partition of the at least one processed parsed unloaded attribute of the data into the database system while continuing to process the remaining unloaded attributes of the data.

50. The computer program product according to claim 49, wherein the operations further comprise indexing each loaded processed parsed unloaded attribute in the database system.

51. The computer program product according to claim 45, wherein the incrementally loading further comprises loading the attributes on the column-store basis, whereby each different column of the received data is loaded independently into the database system.

52. The computer program product according to claim 45, wherein the incrementally loading is selected from a group consisting of:

direct loading, wherein parsed attributes of the received data are loaded into the database system as soon as the attributes are processed, and delayed loading, wherein parsed attributes of the received data are initially temporarily stored in a temporary storage and then loaded into the database system.

53. The computer program product according to claim 45, wherein the incrementally loading further comprises (a) dividing a column of loaded attributes into a plurality of portions;
(b) sorting the plurality of portions to obtain a first order of attributes within the column of loaded attributes;
(c) dividing the plurality of sorted portions of attributes into further plurality of portions;
(d) sorting the further plurality of portions to obtain a second order of attributes within the column of loaded attributes; and
(e) repeating steps (c)-(d) to obtain a final order of attributes of the data.

54. The computer program product according to claim 45, wherein parsing and processing are performed during a map processing task of a MapReduce processing task.

55. A method for processing and transferring data from a file system to a database system, the method comprising the steps of:
receiving a processing task containing a request for accessing data from a file system, wherein the data includes a plurality of attributes identified by the received processing task, each attribute being associated with an object identifier;
determining, based on the processing task, whether at least one partition of at least one attribute of the data has been previously loaded into the database system;
incrementally loading, based on a determination that the at least one partition of at least one attribute of the data has not been previously loaded into the database system, the at least one partition of the at least one attribute of the data into the database system while continuing to process the processing task without loading all attributes in the plurality of attributes identified by the received processing task at the time of receiving the processing task and without loading the at least one partition of at least one attribute of the data into the database system upon determination that the at least one partition has been previously loaded into the database system, the determination is being made based on a catalog containing a mapping of a portion of the plurality of attributes that has been previously loaded into the database system, the at least one loaded partition of the at least one attribute is being stored together with the object identifier associated with the at least one attribute; and
joining the at least one loaded partition and at least another loaded partition of at least another attribute using the object identifier associated with the at least one attribute and another object identifier associated with the at least another attribute, to generate a dataset responsive to the received query;
wherein the loading is performed during a map phase of a MapReduce processing task.

56. The method according to claim 1, wherein the identified plurality of attributes include at least one attribute of data that has been previously loaded into the database system and at least one attribute of data that has not been previously loaded into the database system.

57. The system according to claim 11, wherein the identified plurality of attributes include at least one attribute of data that has been previously loaded into the database system and at least one attribute of data that has not been previously loaded into the database system.

58. The computer program product according to claim 21, wherein the identified plurality of attributes include at least one attribute of data that has been previously loaded into the database system and at least one attribute of data that has not been previously loaded into the database system.

* * * * *